United States Patent
Uchida et al.

(10) Patent No.: US 7,617,155 B2
(45) Date of Patent: Nov. 10, 2009

(54) BILLING SYSTEM, MOBILE TERMINAL, AND BILLING METHOD

(75) Inventors: Motoyuki Uchida, Yokosuka (JP); Tadao Takami, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 436 days.

(21) Appl. No.: 11/334,422

(22) Filed: Jan. 19, 2006

(65) Prior Publication Data

US 2006/0116958 A1    Jun. 1, 2006

Related U.S. Application Data

(62) Division of application No. 10/354,202, filed on Jan. 30, 2003, now abandoned.

(30) Foreign Application Priority Data

Jan. 30, 2002    (JP) .............................. 2002-022201

(51) Int. Cl.
  *G06Q 40/00*    (2006.01)
  *G06F 17/00*    (2006.01)
(52) U.S. Cl. ...................... 705/40; 235/379; 235/378; 235/384
(58) Field of Classification Search ................. 705/40, 705/39; 455/406; 235/379, 378, 384
  See application file for complete search history.

(56) References Cited

U.S. PATENT DOCUMENTS

| | | | |
|---|---|---|---|
| 5,805,082 A | 9/1998 | Hassett | |
| 6,032,858 A | 3/2000 | Yazumi et al. | |
| 6,311,167 B1 | 10/2001 | Davis et al. | |
| 6,536,661 B1 * | 3/2003 | Takami et al. | 235/379 |

(Continued)

FOREIGN PATENT DOCUMENTS

EP    0 950 968 A1    10/1999

(Continued)

OTHER PUBLICATIONS

U.S. Appl. No. 11/334,483, filed Jan. 19, 2006, Uchida et al.

*Primary Examiner*—Hani Kazimi
*Assistant Examiner*—Olabode Akintola
(74) *Attorney, Agent, or Firm*—Oblon, Spivak, McClelland, Maier & Neustadt, L.L.P.

(57) ABSTRACT

To provide a billing system capable of simplifying user's operation and quickly performing a billing process even in the case where there exist a plurality of terminals for billing. A billing system 1 according to the present invention is a billing system for implementing billing by transmitting billing information transmitted from a billing information transmitting terminal 30 to a cellular phone 10, to a billing server 60 on a mobile communication network, in which a service code of a service for which a billing process is allowed is preliminarily stored in the cellular phone 10 and in which, when the billing information is transmitted from the billing information transmitting terminal 30, whether a service code included in the billing information is a service code for which the cellular phone 10 is allowed to perform the process is determined on the basis of whether it agrees with any service code preliminarily stored. When it is then determined that the cellular phone 10 is allowed to perform the billing process, the cellular phone transmits the billing information to the billing server 60 and performs the billing process.

6 Claims, 11 Drawing Sheets

U.S. PATENT DOCUMENTS

| | | |
|---|---|---|
| 2001/0032153 A1 | 10/2001 | Miller |
| 2002/0042776 A1 | 4/2002 | Woo et al. |
| 2002/0188575 A1 | 12/2002 | Freeny |

FOREIGN PATENT DOCUMENTS

| | | |
|---|---|---|
| GB | 2 278 704 | 12/1994 |
| JP | 9-97358 | 4/1997 |
| JP | 2001-84420 | 3/2001 |
| JP | 2001-243382 | 9/2001 |
| JP | 2001-297278 | 10/2001 |
| JP | 2001-307148 | 11/2001 |
| WO | WO 97/45814 | 12/1997 |
| WO | WO99/09502 | 2/1999 |
| WO | WO 00/31691 | 6/2000 |
| WO | WO 01/71627 | 9/2001 |
| WO | WO 01/73575 | 10/2001 |
| WO | WO 01/84503 | 11/2001 |
| WO | WO 01/90514 | 11/2001 |

\* cited by examiner

Fig.2

| Service code | Period of validity |
|---|---|
| 1011 | 2001/12/1~2001/12/31 |
| 1034 | null |
| 1589 | 2001/11/15~2002/2/15 |

| User ID | Date of use | Service code | Bill |
|---|---|---|---|
| U1000 | 2001/12/11 | 1011 | 1800 |
| | 2001/12/25 | 1011 | 1800 |
| | 2001/12/14 | 1034 | 800 |
| U1002 | 2001/11/23 | 1015 | 500 |
| | 2001/12/03 | 1023 | 700 |
| | 2001/12/16 | 1076 | 1800 |
| ⋮ | ⋮ | ⋮ | ⋮ |

| User ID | Date of use | Service code | Entry point | Exit point | Bill |
|---|---|---|---|---|---|
| U1000 | 2001/12/12 | 1058 | station A | station E | 300 |
| | 2001/12/13 | 1058 | station A | station E | 300 |
| | 2001/12/14 | 1058 | station B | station E | 400 |
| | 2001/11/23 | 1053 | station A | station F | 500 |
| | 2001/11/30 | 1053 | station A | station F | 500 |
| U1002 | 2001/12/07 | 1056 | station A | station F | 500 |
| ... | ... | ... | ... | ... | ... |

62

BILLING SYSTEM, MOBILE TERMINAL, AND BILLING METHOD

BACKGROUND OF THE INVENTION

1. Field of the Invention

The present invention relates to a billing system, a mobile terminal, and a billing method making use of a mobile communication network.

2. Related Background Art

There were conventionally known settling methods of effecting settlement by making use of a mobile terminal such as a cellular phone or the like. A settling method of this type is described, for example, in Japanese Patent Application Laid-Open No. 2001-297278.

In the invention described in the above Application, when a customer purchases goods or the like, the customer manipulates a customer's portable device to send a request for settlement of the purchase of goods to a retailer's portable device. Then the customer checks the details of the purchase of goods transmitted from the retailer's portable device and thereafter sends the details of the purchase of goods to a net-bank device, thereby implementing the settlement.

SUMMARY OF THE INVENTION

However, the invention described in the above Application had the problem that quickness was not secured for the billing process. Namely, for purchasing goods or the like, the customer had to request the settlement of the purchase of goods, check the details, etc. through the customer's portable device, so that the customer's operation was troublesome and consumed a lot of time for settlement. If there exist a plurality of retailer's portable terminals around the customer's portable terminal, the customer has to determine which retailer's portable terminal should be used for communication and settlement and the operation becomes much complicated in such cases.

An object of the present invention is, therefore, to solve the above problem and thereby provide a billing system, a mobile terminal, and a billing method capable of simplifying the customer's (user's) operation and quickly performing the billing process even in the case where there exit a plurality of terminals for billing.

A billing system according to the present invention is a billing system making use of a mobile communication network, which comprises: a billing server provided on the mobile communication network; a billing information transmitting terminal for transmitting billing information including a service code specifying a service of a billing object, to a mobile terminal by short-range wireless; and the mobile terminal for receiving the billing information transmitted from the billing information transmitting terminal and for transmitting the received billing information through the mobile communication network to the billing server, wherein the mobile terminal comprises: service code storing means storing a service code of a service for which the mobile terminal is allowed to perform a billing process; billing information receiving means for receiving the billing information transmitted from the billing information transmitting terminal; service code determining means for determining whether the service specified by the service code in the billing information received by the billing information receiving means is a service for which the mobile terminal is allowed to perform the billing process, on the basis of the service code stored in the service code storing means; and billing information transmitting means for transmitting the billing information to the billing server when the service code determining means determines that the service is one for which the mobile terminal is allowed to perform the billing process.

In the billing system according to the present invention, the mobile terminal has the service code storing means, which stores a service code of a service or service codes of services for which the mobile terminal is allowed to perform the billing process. When the billing information including a service code is transmitted from the billing information transmitting terminal, the service code determining means determines whether it is a service for which the mobile terminal is allowed to perform the billing process, with reference to the service code storing means. When the result of the determination is that it is a service for which the mobile terminal is allowed to perform the billing process, the billing information transmitting means transmits the billing information to the billing server. When the user of the mobile terminal preliminarily stores the service code(s) of the service(s) for which the mobile terminal is allowed to perform the billing process, in the service code storing means of the mobile terminal, as described above, the operation becomes simple in the billing process. Since the mobile terminal determines whether a service is one for which it is allowed to perform the billing process, on the basis of the service code preliminarily stored, even in the case where there exist a plurality of billing information transmitting terminals in the communication range of the mobile terminal and where the mobile terminal receives billing information from each of the billing information transmitting terminals, the mobile terminal is able to perform the billing process for only the predetermined service, without need for selecting the billing information by user's operation. The "services" as objects of the billing process by the mobile terminal include, for example, provision of entertainments in theaters and amusement parks, transportation on trains, etc., and "receiving a service" means an entry into a theater or into an amusement park, or, in the case of the transportation on a train, to pass a ticket gate and get on a train. Since in the present invention whether the billing process is allowed is determined on the basis of the service code preliminarily stored, in order to simplify the processing in billing, it is preferable that a service as an object be one for which a fee (bill) thereof is uniquely determined by specifying the service. Since cigarettes, magazines, etc. also have their prices determined according to kinds, the purchase of cigarettes and magazines can also be handled as a service in the present invention. In the present invention, examples of the short-range wireless communication used for communication between the mobile terminal and the billing information transmitting terminal include communication by Bluetooth (Registered Trademark), infrared communication, etc., and it is also possible to use non-contact IC or the like.

In the above billing system, preferably, the billing information includes information on a bill.

When the billing information includes the information on the bill, the billing server receiving the billing information can store the information on the bill included in the received billing information as it is, and does not have to perform a process of searching for the bill on the basis of the service code. Therefore, the above configuration permits smooth processing in the billing server.

The above billing system may be configured so that the mobile terminal further comprises billing information request transmitting means for transmitting a billing information request to request the billing information, to the billing information transmitting terminal by short-range wireless and so that the billing information transmitting terminal transmits the billing information when receiving the billing information request transmitted from the mobile terminal.

In this configuration, the billing information transmitting terminal transmits the billing information only when receiving the billing information request from the mobile terminal, whereby the billing information can be efficiently transmitted. The billing information request transmitting means may be configured to transmit the billing information request in accordance with a user's demand or to transmit the billing information request on a periodic basis. "Periodic" means, for example, every second or every two seconds. This interval can be changed in accordance with user's request.

The above billing system may be configured so that the billing information transmitting terminal further comprises billing point notification information transmitting means for transmitting billing point notification information indicating a billing point where the billing information transmitting terminal is located, to an interior of a wireless-communicable area and so that, when receiving the billing point notification information transmitted from the billing point notification information transmitting means, the mobile terminal lets the billing information request transmitting means transmit the billing information request to the billing information transmitting terminal.

Since the billing information transmitting terminal transmits the billing point notification information to the interior of the wireless-communicable area, the mobile terminal entering the area can recognize that it comes to a point (spot) where billing is conducted. When receiving this billing point notification information, the mobile terminal then sends the billing information request; this permits the mobile terminal to transmit the billing information request only upon the entry into the billing point, and thus the billing information request can be efficiently transmitted.

A mobile terminal according to the present invention is a mobile terminal applied to a billing system in a configuration in which a billing process is performed so that the mobile terminal receives billing information transmitted from a billing information transmitting terminal located at a point of billing and transmits the received billing information to a billing server provided on a mobile communication network, the mobile terminal comprising: service code storing means storing a service code of a service for which the mobile terminal is allowed to perform the billing process; billing information receiving means for receiving the billing information including a service code, transmitted from the billing information transmitting terminal by short-range wireless; service code determining means for determining whether a service specified by the service code in the billing information received by the billing information receiving means is a service for which the mobile terminal is allowed to perform the billing process, on the basis of the service code stored in the service code storing means; and billing information transmitting means for transmitting the billing information to the billing server when the service code determining means determines that the service is one for which the mobile terminal is allowed to perform the billing process.

The mobile terminal according to the present invention has the service code storing means, which stores a service code of a service or service codes of services for which the mobile terminal is allowed to perform the billing process. When the billing information including a service code is transmitted from the billing information transmitting terminal, the service code determining means determines whether it is a service for which the mobile terminal is allowed to perform the billing process, with reference to the service code storing means. When the result of the determination is that it is a service for which the mobile terminal is allowed to perform the billing process, the billing information transmitting means transmits the billing information to the billing server. When the user of the mobile terminal preliminarily stores the service code(s) of the service(s) for which the mobile terminal is allowed to perform the billing process, in the service code storing means of the mobile terminal, as described above, the operation becomes simple in the billing process. Since the mobile terminal determines whether a service is one for which it is allowed to perform the billing process, on the basis of the service code preliminarily stored, even in the case where there exist a plurality of billing information transmitting terminals in the communication range of the mobile terminal and where the mobile terminal receives billing information from each of the billing information transmitting terminals, the mobile terminal is able to perform the billing process for only the predetermined service, without need for selecting the billing information by user's operation.

Another billing system according to the present invention is a billing system applied to a billing scheme of determining a bill on the basis of entry into and exit from a billing zone, and comprising a billing server provided on a mobile communication network, a mobile terminal for transmitting billing information through the mobile communication network to the billing server, an entry point terminal located at an entry point into the billing zone and configured to communicate with the mobile terminal by short-range wireless, and an exit point terminal located at an exit point out of the billing zone and configured to communicate with the mobile terminal by short-range wireless, wherein the entry point terminal comprises: entry point information transmitting means for transmitting entry point information about the entry point along with a service code specifying a service of a billing object, to the mobile terminal, wherein the exit point terminal comprises: entry point information request transmitting means for transmitting an entry point information request to request entry point information, along with a service code specifying a service of a billing object to the mobile terminal; bill determining means for determining a bill on the basis of the entry point information transmitted according to the entry point information request from the mobile terminal; and billing information transmitting means for transmitting billing information including the bill determined by the bill determining means, to the mobile terminal, and wherein the mobile terminal comprises: service code storing means storing a service code of a service for which the mobile terminal is allowed to perform a billing process; service code determining means for determining whether the service specified by the service code transmitted from the entry point terminal or from the exit point terminal is a service for which the mobile terminal is allowed to perform the billing process, on the basis of the service code stored in the service code storing means; entry point information storing means for storing the entry point information about the entry point into the billing zone; entry point information receiving means for receiving the entry point information transmitted from the entry point terminal and for, when the service code determining means determines that the service code transmitted along with the entry point information is a service code for which the mobile terminal is allowed to perform the billing process, storing the entry point information received, in the entry point information storing means; entry point information request receiving means for receiving the entry point information request and the service code transmitted from the exit point terminal; entry point information transmitting means for, when the service code determining means determines that the service code received by the entry point information request receiving means is a service code for which the mobile terminal is allowed to perform the billing process, retrieving the entry point information stored in the entry point information storing means and transmitting the entry point information to the exit point terminal; billing information receiving means for receiving the billing information transmitted from the exit point terminal; and billing information transmitting means for transmitting the billing information received by the billing information receiving means, through the mobile communication network to the billing server.

In the billing system according to the present invention, the mobile terminal has the service code storing means, which stores a service code of a service or service codes of services for which the mobile terminal is allowed to perform the billing process. When the entry point information is transmitted with the service code from the entry point terminal located at the entry point of the billing zone, the service code determining means determines whether the service is one for which the mobile terminal is allowed to perform the billing process, with reference to the service code storing means. When the result of the determination is that the service is one for which the mobile terminal is allowed to perform the billing process, the entry point information received is stored in the entry point storing means. When the entry point information request is transmitted with the service code from the exit point terminal located at the exit point of the billing zone, the service code determining means determines whether the service is one for which the mobile terminal is allowed to perform the billing process, with reference to the service code storing means. When the result of the determination is that the service is one for which the mobile terminal is allowed to perform the billing process, the mobile terminal retrieves the entry point information from the entry point information storing means in accordance with the entry point information request received and transmits it to the exit point terminal. Then the exit point terminal determines the bill on the basis of the entry point information transmitted from the mobile terminal. When the user of the mobile terminal preliminarily stores the service code(s) of the service(s) for which the mobile terminal is allowed to perform the billing process, in the service code storing means of the mobile terminal, as described above, the operation becomes simple upon the entry and exit into and out of the billing zone. Particularly, at the ticket gates in train stations and at the tollgates of highways, quick passage through the gates is required in order to prevent congestion, and, therefore, the present invention achieving the simple operation in the mobile terminal is effectively applicable. Since the mobile terminal determines whether the service is one for which the mobile terminal is allowed to perform the billing process, on the basis of the service code preliminarily stored, even in the case where there exist a plurality of entry point terminals or exit point terminals in the communication range of the mobile terminal and where the mobile terminal receives the entry point information or the entry point information request from each of the entry point terminals or the exit point terminals, the mobile terminal is able to perform the billing process for the entry and exit into and out of the predetermined billing zone while the user does not have to select the entry point information or the entry point information request by operation. In the present invention, examples of the short-range wireless communication used in communication between the mobile terminal, and the entry point terminal or the exit point terminal include communication by Bluetooth(Registered Trademark), infrared communication, etc., and it is also possible to use non-contact IC or the like.

In the above billing system, the entry point information receiving means stores the entry point information in association with the service code received with the entry point information, in the entry point information storing means, and the entry point information transmitting means of the mobile terminal retrieves the entry point information stored in association with the service code received by the entry point information request receiving means, from the entry point information storing means and transmits the entry point information to the exit point terminal.

When the entry point information is stored in association with the service code in the entry point information storing means as described, each entry point information can be identified by the service code associated therewith, and thus a plurality of entry point information items can be stored in the entry point information storing means.

The above billing system may be configured so that the mobile terminal further comprises: determination result transmitting means for transmitting a result of the determination by the service code determining means on whether the service code is a service code for which the mobile terminal is allowed to perform the billing process, to the entry point terminal or to the exit point terminal and so that the entry point terminal and the exit point terminal further comprise a gate controlled to open and close on the basis of the result of the determination on the service code transmitted from the mobile terminal.

When the mobile terminal has the determination result transmitting means for transmitting the result of the determination on the service code to the entry point terminal or to the exit point terminal as described, the entry point terminal or the exit point terminal can determine whether the mobile terminal is allowed to perform the billing process, on the basis of the result of the determination transmitted from the mobile terminal, and can open and close the gate controlling the entry into or the exit out of the billing zone.

Another billing system according to the present invention is a billing system applied to a billing scheme of determining a bill on the basis of entry into and exit from a billing zone, and comprising a billing server provided on a mobile communication network, a mobile terminal for transmitting billing information through the mobile communication network to the billing server, an entry point terminal located at an entry point into the billing zone and configured to communicate with the mobile terminal by short-range wireless, and an exit point terminal located at an exit point out of the billing zone and configured to communicate with the mobile terminal by short-range wireless, wherein the entry point terminal comprises: service code transmitting means for transmitting a service code specifying a service of a billing object, to the mobile terminal; and bill information transmitting means for, when receiving from the mobile terminal a result of determination that the service code transmitted by the service code transmitting means is one for which the mobile terminal is allowed to perform a billing process, transmitting bill information for determining a bill on the basis of the exit point, wherein the exit point terminal comprises: exit point information transmitting means for transmitting exit point information along with a service code specifying a service of a billing object, to the mobile terminal, and wherein the mobile terminal comprises: service code storing means storing a service code of a service for which the mobile terminal is allowed to perform the billing process; service code determining means for determining whether the service specified by the service code transmitted from the entry point terminal or from the exit point terminal is a service for which the mobile terminal is allowed to perform the billing process, on the basis of the service code stored in the service code storing means; determination result transmitting means for transmitting a result of the determination by the service code determining means on whether the service code is one for which the mobile terminal is allowed to perform the billing process, to the entry point terminal or to the exit point terminal; bill information receiving means for receiving the bill information transmitted from the entry point terminal; bill information storing means for storing the bill information received by the bill information receiving means; exit point information receiving means for receiving the exit point information and the service code transmitted from the exit point terminal; bill calculating means for, when the service code determining means determines that the service code received by the exit point information receiving means is a service code for which the mobile terminal is allowed to perform the billing process, calculating a bill on the basis of the bill information stored in the bill information storing means and the exit point information received by the exit point information receiving means; and billing information transmitting means for transmitting billing information including the bill calculated by the bill calculating means, through the mobile communication network to the billing server.

In the billing system according to the present invention, the mobile terminal has the service code storing means, which stores a service code of a service or service codes of services for which the mobile terminal is allowed to perform the billing process. When a service code is transmitted from the entry point terminal located at the entry point of the billing zone, the service code determining means determines whether the service is a service for which the mobile terminal is allowed to perform the billing process, with reference to the service code storing means, and the result of the determination is transmitted to the entry point terminal. When the result of the determination is that the service is one for which the mobile terminal is allowed to perform the billing process, the entry point terminal transmits the bill information to the mobile terminal. When the exit point information is transmitted along with the service code from the exit point terminal located at the exit point of the billing zone, the service code determining means determines whether the service is one for which the mobile terminal is allowed to perform the billing process, with reference to the service code storing means. When the result of the determination is that the service is one for which the mobile terminal is allowed to perform the billing process, the mobile terminal determines the bill on the basis of the received exit point information and the bill information stored in the bill information storing means, and sends the billing information including the bill, to the billing server. When the user of the mobile terminal preliminarily stores the service code(s) of the service(s) for which the mobile terminal is allowed to perform the billing process, in the service code storing means of the mobile terminal, as described above, the operation becomes simple upon the entry and exit into and out of the billing zone. Particularly, at the ticket gates in train stations and at the tollgates of highways, quick passage through the gates is required in order to prevent congestion, and thus the present invention achieving the simple operation in the mobile terminal is effectively applicable. Since the mobile terminal determines whether the service is one for which the mobile terminal is allowed to perform the billing process, on the basis of the service code preliminarily stored, even in the case where there exist a plurality of entry point terminals or exit point terminals in the communication zone of the mobile terminal and where the mobile terminal receives the entry point information or the entry point information request from each of the entry point terminals or exit point terminals, the mobile terminal is able to perform the billing process for the entry into or the exit out of the predetermined billing zone while the user does not have to select the entry point information or the entry point information request by operation.

The above billing system may be configured so that the entry point terminal and the exit point terminal further comprise a gate controlled to open and close on the basis of the result of the determination on the service code transmitted by the determination result transmitting means from the mobile terminal.

When the entry point terminal or the exit point terminal determines whether the mobile terminal is allowed to perform the billing process, on the basis of the result of the determination transmitted from the mobile terminal in this way, the gate to regulate the entry into or the exit out of the billing zone can be opened and closed based thereon.

A billing method according to the present invention is a billing method of performing billing by a billing server provided on a mobile communication network, a billing information transmitting terminal for transmitting billing information to a mobile terminal, and a mobile terminal for receiving the billing information transmitted from the billing information transmitting terminal and for transmitting the received billing information to the billing server, the billing method comprising: a first billing information transmitting step of transmitting billing information including a service code specifying a service of a billing object, from the billing information transmitting terminal to the mobile terminal by short-range wireless; a service code determining step of determining whether the service specified by the service code in the billing information transmitted in the first billing information transmitting step is a service for which the mobile terminal is allowed to perform a billing process, with reference to service code storing means preliminarily storing a service code for which the mobile terminal is allowed to perform the billing process; and a second billing information transmitting step of, when it is determined in the service code determining step that the service code transmitted in the first billing information transmitting step is a service code for which the mobile terminal is allowed to perform the billing process, transmitting the billing information from the mobile terminal through the mobile communication network to the billing server.

In the billing method according to the present invention, when the billing information including the service code is transmitted from the billing information transmitting terminal, the service code determining step is carried out to determine whether the service specified by the service code transmitted is a service for which the mobile terminal is allowed to perform the billing process, with reference to the service code preliminarily stored in the service code storing means. When the result of the determination is that the service is one for which the mobile terminal is allowed to perform the billing process, the second billing information transmitting step is carried out to transmit the billing information to the billing server. When the user of the mobile terminal preliminarily stores a service code of a service or service codes of services for which the mobile terminal is allowed to perform the billing process, in the service code storing means of the mobile terminal, as described above, the operation becomes simple in the billing process. Since the mobile terminal determines whether the service is one for which the mobile terminal is allowed to perform the billing process, on the basis of the service code preliminarily stored, even in the case where there exit a plurality of billing information transmitting terminals in the communication range of the mobile terminal and where the billing information is received from each of the billing information transmitting terminals, the mobile terminal is able to perform the billing process for only the predetermined service while the user does not have to select the billing information by operation.

In the above billing method, preferably, the billing information includes information on a bill.

When the billing information includes the information on the bill, the billing server receiving the billing information can store the information on the bill included in the received billing information as it is; this obviates the need for a process of searching for the bill on the basis of the service code, and thus the processing becomes smooth in the billing server.

The above billing method may be configured to further comprise a billing information request transmitting step of transmitting a billing information request to request the billing information, from the mobile terminal to the billing information transmitting terminal by short-range wireless, and configured so that, when the billing information request is transmitted in the billing information request transmitting step, a transition is made into the first billing information transmitting step.

With use of this method, the billing information transmitting terminal can be configured to transmit the billing information to the mobile terminal in the first billing information transmitting step only when the billing information transmitting terminal receives the billing information request transmitted from the mobile terminal in the billing information request transmitting step; therefore, the billing information can be efficiently transmitted. The billing information request transmitting step may be configured to transmit the billing information request by user's operation or to transmit the billing information request on a periodic basis. "Periodic" means, for example, every second or every two seconds. This interval can be changed in accordance with user's request.

The above billing method may be configured to further comprise a billing point notification information transmitting step of transmitting billing point notification information indicating a billing point where the billing information transmitting terminal is located, from the billing information transmitting terminal to an interior of a wireless-communicable area, and configured so that, when the mobile terminal receives the billing point notification information transmitted in the billing point notification information transmitting step, a transition is made into the billing information request transmitting step.

When the billing point notification information is transmitted to the interior of the wireless-communicable area of the billing information transmitting terminal in the billing point notification information transmitting step, the mobile terminal entering the area can recognize that it comes to the point (spot) where the billing is conducted. When receiving this billing point notification information, the mobile terminal transmits the billing information request; thus, the mobile terminal needs to transmit the billing information request only upon the entry into the billing point, whereby the billing information request can be efficiently transmitted in the billing information request step.

Another billing method according to the present invention is a billing method applied to a billing scheme of determining a bill on the basis of entry into and exit from a billing zone, and adapted to perform billing by a billing server provided on a mobile communication network, a mobile terminal for transmitting billing information through the mobile communication network to the billing server, an entry point terminal located at an entry point into the billing zone and configured to communicate with the mobile terminal by short-range wireless, and an exit point terminal located at an exit point out of the billing zone and configured to communicate with the mobile terminal by short-range wireless, the billing method comprising: a first entry point information transmitting step of transmitting entry point information about the entry point along with a service code specifying a service of a billing object, from the entry point terminal to the mobile terminal; a first service code determining step of determining whether the service specified by the service code transmitted in the first entry point information transmitting step is a service for which the mobile terminal is allowed to perform a billing process, with reference to service code storing means preliminarily storing a service code for which the mobile terminal is allowed to perform the billing process; an entry point information storing step of, when it is determined in the first service code determining step that the service code transmitted in the first entry point information transmitting step is a service code for which the mobile terminal is allowed to perform the process, storing the entry point information transmitted to the mobile terminal in the first entry point information transmitting step, in entry point information storing means; an entry point information request transmitting step of transmitting an entry point information request to request entry point information, along with a service code specifying a service of a billing object from the exit point terminal to the mobile terminal; a second service code determining step of determining whether the service specified by the service code transmitted in the entry point information request transmitting step is a service code for which the mobile terminal is allowed to perform the billing process, with reference to the service code storing means preliminarily storing the service code for which the mobile terminal is allowed to perform the billing process; a second entry point information transmitting step of, when it is determined in the second service code determining step that the service code transmitted in the entry point information request transmitting step is a service code for which the mobile terminal is allowed to perform the process, retrieving the entry point information stored in the entry point information storing means and transmitting the entry point information from the mobile terminal to the exit point terminal; a bill determining step of letting the exit point terminal determine a bill on the basis of the entry point information transmitted in the entry point information transmitting step; a first billing information transmitting step of transmitting billing information including the bill determined in the bill determining step, from the exit point terminal to the mobile terminal; and a second billing information transmitting step of transmitting the billing information transmitted in the first billing information transmitting step, from the mobile terminal through the mobile communication network to the billing server.

In the billing method according to the present invention, the first service code determining step is arranged so that, when the entry point information is transmitted with the service code from the entry point terminal located at the entry point of the billing zone, whether the service specified by the service code thus transmitted is a service for which the mobile terminal is allowed to perform the billing process is determined on the basis of the service code preliminarily stored in the service code storing means. When the result of the determination is that the service is one for which the mobile terminal is allowed to perform the billing process, the entry point information transmitted from the entry point terminal is stored in the entry point storing means in the entry point information storing step. In the second service code determining step, when the entry point information request is transmitted with the service code from the exit point terminal located at the exit point of the billing zone, whether the service specified by the service code thus transmitted is a service for which the mobile terminal is allowed to perform the billing process is determined on the basis of the service code preliminarily stored in the service code storing means. When the result of the determination is that the service is one for which the mobile terminal is allowed to perform the billing process, the entry point information is retrieved from the entry point information storing means and then transmitted to the exit point terminal in the second entry point information transmitting step. Then the exit point terminal determines the bill on the basis of the transmitted entry point information in the bill determining step. Since whether the service code is one for which the mobile terminal is allowed to perform the billing process is determined on the basis of the service code for which the mobile terminal is allowed to perform the billing process, which is preliminarily stored, in the first service code determining step and in the second service code determining step, as described above, the user of the mobile terminal is able to perform the operation simply upon the entry into or the exit out of the billing zone. Particularly, at the ticket gates in train stations and at the tollgates of highways, quick passage through the gates is required in order to prevent congestion, and thus the present invention achieving the simple operation in the mobile terminal is effectively applicable. Since the mobile terminal determines whether the service is one for which the mobile terminal is allowed to perform the billing process, on the basis of the service code preliminarily stored, even in the case where there exist a plurality of entry point terminals or exit point terminals in the communication range of the mobile terminal and where the mobile terminal receives the entry point information or the entry point information request from each of the entry point terminals or the exit point terminals, the mobile terminal is able to perform the billing process for the entry and exit into and out of the predetermined billing zone while the user does not have to select the entry point information or the entry point information request by operation.

The above billing method may be configured so that the entry point information storing step is to store the entry point information in association with the service code received in the first entry point information transmitting step, in the entry point information storing means and so that the second entry point information transmitting step is to retrieve the entry point information stored in association with the service code received in the entry point information request transmitting step, from the entry point information storing means and transmit the entry point information to the exit point terminal.

When the entry point information is stored in association with the service code in the entry point information storing means in this way, each entry point information can be identified by the service code associated therewith, and thus a plurality of entry point information items can be stored in the entry point information storing means.

The above billing method may be configured to further comprise a first determination result transmitting step of transmitting a result of the determination in the first service code determining step from the mobile terminal to the entry point terminal; an entry gate opening and closing step of opening and closing a gate provided at the entry point terminal, on the basis of the result of the determination transmitted in the first determination result transmitting step; a second determination result transmitting step of transmitting a result of the determination in the second service code determining step from the mobile terminal to the exit point terminal; and an exit gate opening and closing step of opening and closing a gate provided at the exit point terminal, on the basis of the result of the determination transmitted in the second determination result transmitting step.

When the result of the determination on the service code is transmitted from the mobile terminal to the entry point terminal or to the exit point terminal in the determination result transmitting step as described above, the entry point terminal or the exit point terminal can determine whether the mobile terminal is allowed to perform the billing process, on the basis of the result of the determination transmitted from the mobile terminal, and the gate to control the entry into or the exit out of the billing zone can be opened and closed based thereon.

Another billing method according to the present invention is a billing method applied to a billing scheme of determining a bill on the basis of entry into and exit from a billing zone, and adapted to perform billing by a billing server provided on a mobile communication network, a mobile terminal for transmitting billing information through the mobile communication network to the billing server, an entry point terminal located at an entry point into the billing zone and configured to communicate with the mobile terminal by short-range wireless, and an exit point terminal located at an exit point out of the billing zone and configured to communicate with the mobile terminal by short-range wireless, the billing method comprising: a service code transmitting step of transmitting s service code specifying a service of a billing object, from the entry point terminal to the mobile terminal; a first service code determining step of determining whether the service specified by the service code transmitted in the service code transmitting step is a service for which the mobile terminal is allowed to perform a billing process, with reference to service code storing means preliminarily storing a service code for which the mobile terminal is allowed to perform the billing process; a first determination result transmitting step of transmitting a result of the determination on the service code made in the first service code determining step, from the mobile terminal to the entry point terminal; a bill information transmitting step of, when a result of the determination that the mobile terminal is allowed to perform the billing process is transmitted in the first determination result transmitting step, transmitting bill information for determining a bill on the basis of the exit point, from the entry point terminal to the mobile terminal; a bill information storing step of storing the bill information transmitted from the entry point terminal in the bill information transmitting step, in bill information storing means; an exit point information transmitting step of transmitting exit point information along with a service code specifying a service of a billing object, from the exit point terminal to the mobile terminal; a second service code determining step of determining whether the service specified by the service code transmitted in the exit point information transmitting step is a service code for which the mobile terminal is allowed to perform the billing process, with reference to the service code storing means preliminarily storing the service code for which the mobile terminal is allowed to perform the billing process; a bill calculating step of, when it is determined in the second service code determining step that the service code transmitted in the exit point information transmitting step is a service code for which the mobile terminal is allowed to perform the process, calculating a bill on the basis of the bill information stored in the bill information storing means and the exit point information transmitted in the exit point information transmitting step; and a billing information transmitting step of transmitting billing information including the bill calculated in the bill calculating step, through the mobile communication network to the billing server.

In the billing method according to the present invention, the first service code determining step is arranged so that, when the service code is transmitted from the entry point terminal located at the entry point of the billing zone, whether the service specified by the service code transmitted is a service for which the mobile terminal is allowed to perform the billing process is determined on the basis of the service code preliminarily stored in the service code storing means, and the result of the determination is transmitted to the entry point terminal. When it is determined that the service is one for which the mobile terminal is allowed to perform the billing process, the bill information is transmitted from the entry point terminal to the mobile terminal in the bill information transmitting step. In the second service code determining step, when the exit point information is transmitted with the service code from the exit point terminal located at the exit point of the billing zone, whether the service specified by the service code transmitted is a service for which the mobile terminal is allowed to perform the billing process is determined on the basis of the service code preliminarily stored in the service code storing means. When the result of the determination is that the service is one for which the mobile terminal is allowed to perform the billing process, the bill is determined on the basis of the received exit point information and the bill information stored in the bill information storing means, and the billing information including the bill is transmitted to the billing server. Since whether the service code is one for which the mobile terminal is allowed to perform the billing process is determined on the basis of the service code for which the mobile terminal is allowed to perform the billing process, which is preliminarily stored, in the first service code determining step and in the second service code determining step, as described above, the user of the mobile terminal is able to perform the operation simply upon the entry into or the exit out of the billing zone. Particularly, at the ticket gates in train stations and at the tollgates of highways, quick passage through the gates is required in order to prevent congestion, and thus the present invention achieving the simple operation in the mobile terminal is effectively applicable. Since the mobile terminal determines whether the service is one for which the mobile terminal is allowed to perform the billing process, on the basis of the service code preliminarily stored, even in the case where there exist a plurality of entry point terminals or exit point terminals in the communication zone of the mobile terminal and where the mobile terminal receives the entry point information or the entry point information request from each of the entry point terminals or the exit point terminals, the mobile terminal is able to perform the billing process for the entry and exit into and out of the predetermined billing zone while the user does not have to select the entry point information or the entry point information request by operation.

The above billing method may be configured to further comprise an entry gate opening and closing step of opening and closing a gate provided at the entry point terminal, on the basis of the result of the determination transmitted in the first determination result transmitting step; a second determination result transmitting step of transmitting a result of the determination in the second service code determining step from the mobile terminal to the exit point terminal; and an exit gate opening and closing step of opening and closing a gate provided at the exit point terminal, on the basis of the result of the determination transmitted in the second determination result transmitting step.

When the billing method is so arranged in this way that the first determination result transmitting step is to transmit the result of the determination on the service code from the mobile terminal to the entry point terminal and that the second determination result transmitting step is to transmit the result of the determination on the service code from the mobile terminal to the exit point terminal, the entry point terminal or the exit point terminal can determine whether the mobile terminal is allowed to perform the billing process, on the basis of the result of the determination transmitted from the mobile terminal, and the gate to regulate the entry into or the exit out of the billing zone can be opened and closed based thereon.

BRIEF DESCRIPTION OF THE DRAWINGS

FIG. 2 is a diagram showing an example of data stored in the service code file.

FIG. 3 is a diagram showing an example of data stored in the billing information DB.

FIG. 8 is a diagram showing an example of data stored in the billing information DB.

DETAILED DESCRIPTION OF THE PREFERRED EMBODIMENTS

The preferred embodiments of the billing system according to the present invention will be described below in detail with reference to the drawings. The same elements will be denoted by the same reference symbols throughout the description of the drawings, and redundant description will be omitted.

Figure 1:
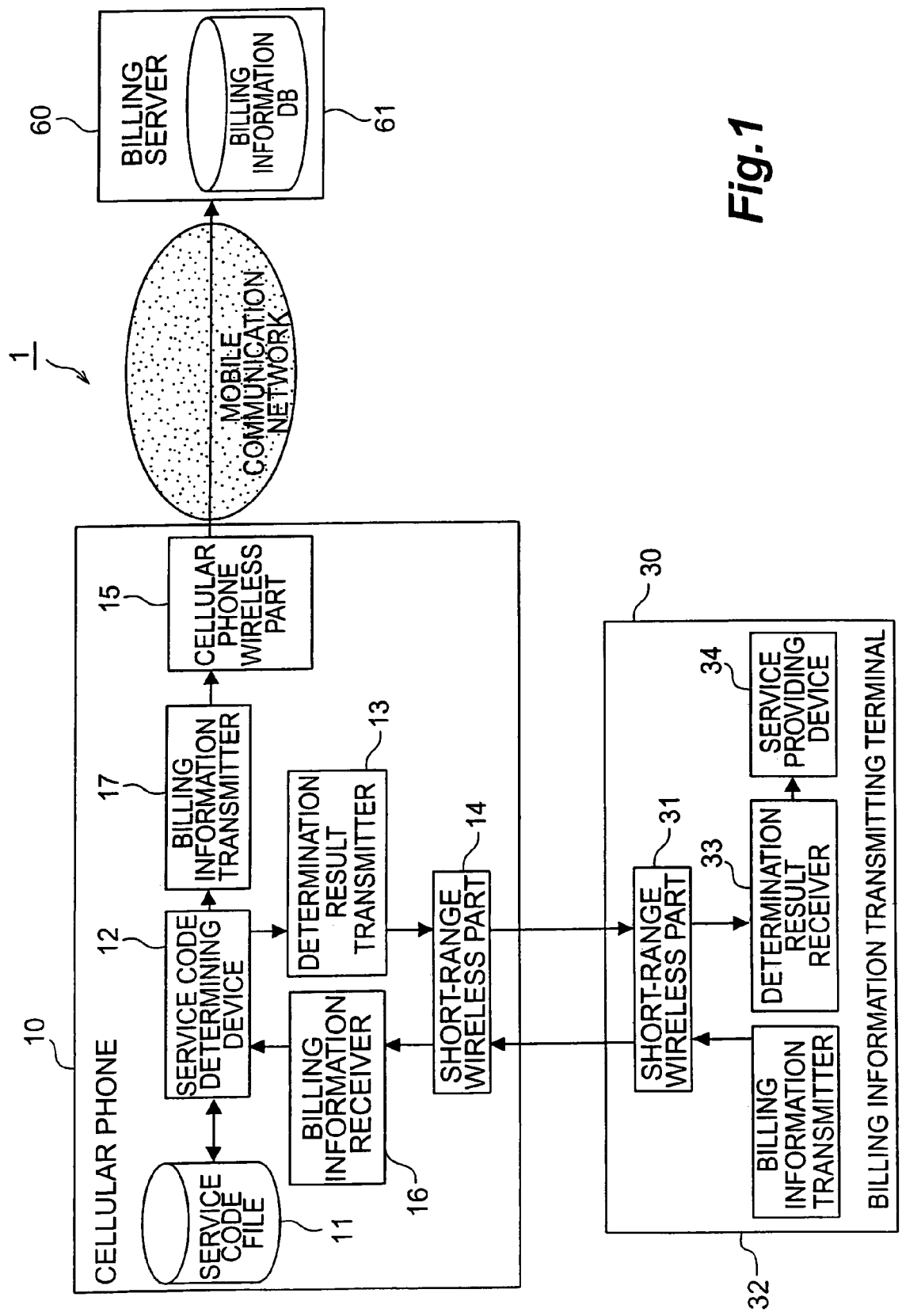
FIG. 1 is a diagram showing the configuration of the billing system according to the first embodiment.

FIG. 1 is a block diagram showing the configuration of the billing system 1 according to the first embodiment. The billing system 1 of the embodiment has a billing server 60 provided on a mobile communication network, a cellular phone (mobile terminal) 10 communicable with the billing server 60 through the mobile communication network, and a billing information transmitting terminal 30 communicable with the cellular phone 10 by short-range wireless.

The cellular phone 10 has a short-range wireless part 14 for communication with the billing information transmitting terminal 30; a cellular phone radio part 15 for communication with the billing server 60 through the mobile communication network; a service code file 11 storing a service code of a service for which the cellular phone 10 is allowed to perform the billing process; a billing information receiver 16 for receiving billing information transmitted from the billing information transmitting terminal 30 by short-range wireless; a service code determining device 12 for determining whether a service code included in the billing information is a service code for which the cellular phone 10 is allowed to perform the billing process; a determination result transmitter 13 for transmitting the result of the determination by the service code determining device 12, to the billing information transmitting terminal 30; and a billing information transmitter 17 for transmitting the billing information transmitted from the billing information transmitting terminal 30, through the mobile communication network to the billing server 60.

Each of the elements constituting the cellular phone 10 will be described below. The short-range wireless part 14 is a wireless part for performing communication by short-range wireless such as Bluetooth (Registered Trademark), which can perform wireless communication with peripheral devices having a wireless part of the same protocol. In the present embodiment the short-range wireless part 14 is comprised of the wireless part based on Bluetooth(Registered Trademark), but it can also be comprised of a wireless part adapted for infrared communication, a non-contact type IC reading device, or the like.

The billing information receiver 16 has a function of receiving the billing information transmitted from the billing information transmitting terminal 30 by short-range wireless. The billing information herein includes a service code specifying a service of a billing object and, preferably, also includes information on a bill or the like.

The service code file 11 is a file storing a service code of a service for which the cellular phone 10 is allowed to perform the billing process. FIG. 2 is a diagram showing an example of data stored in the service code file 11. As shown in FIG. 2, the service code file 11 stores information of "service code" and "period of validity." The "service code" is a code for specifying a service for which the cellular phone 10 is allowed to perform the billing process, and the user of the cellular phone 10 preliminarily registers such codes to store the information in the file. The service codes can be registered by a method in which the user manually enters each service code by means of the keypads of the cellular phone 10, or by a method in which the user accesses a predetermined site through the mobile communication network and downloads each service code from the predetermined site. Another potential method is a method of receiving a service code transmitted from a neighboring terminal by use of short-range wireless. This permits the user to register a service code at a ticket window of a theater or to register a service code at a commuter pass booth of a train station. The "period of validity" is information about a period of validity of a service specified by each service code. This makes the system adaptable to time-limited services. In the present embodiment the service code file 11 is configured to store the information of "service code" and "period of validity," but it may be configured to further store information on a service name indicating the contents of each service, a bill for each service, and so on.

The service code determining device 12 has a function of determining whether the service specified by the service code in the billing information received by the billing information receiver 16 is a service for which the cellular phone 10 is allowed to perform the billing process. Specifically, it determines whether the service code included in the billing information agrees with any service code stored in the service code file 11; if the service code agrees with one of the stored codes it is determined that the cellular phone 10 is allowed to perform the billing process; otherwise it is determined that the billing process is not allowed.

The determination result transmitter 13 has a function of transmitting the result of the determination by the service code determining device 12, to the billing information transmitting terminal 30. The result of the determination transmitted herein is information on whether the cellular phone 10 is allowed to perform the billing process for the service specified by the service code.

The billing information transmitter 17 has a function of transmitting the billing information received by the billing information receiver 16, through the mobile communication network to the billing server 60. When it is determined that the cellular phone 10 is allowed to perform the billing process for the service specified by the service code in the billing information, the billing information transmitter 17 transmits the billing information to the billing server 60.

The cellular phone wireless part 15 is a wireless communication part for performing communication through the mobile communication network, which is the same as that of the ordinary cellular phones.

The billing information transmitting terminal 30 will be described below. The billing information transmitting terminal 30 has a short-range wireless part 31 for communication with the cellular phone 10; a billing information transmitter 32 for transmitting the billing information; a determination result receiver 33 for receiving the result of the determination on the service code transmitted from the cellular phone 10; and a service providing device 34 for providing a service as a billing object. The billing information transmitting terminal 30 in the first embodiment is located, for example, at an entry of a theater, and has a function of transmitting the billing information to the cellular phone 10 and providing the service of allowing the user of the cellular phone 10 to enter the theater.

The short-range wireless part 31 is a wireless part having the same protocol as the short-range wireless part 14 of the cellular phone 10 has, which enables communication with the cellular phone 10.

The billing information transmitter 32 has a function of transmitting the billing information for the service provided at the billing point where the billing information transmitting terminal 30 is located.

The determination result receiver 33 has a function of receiving the result of the determination on the service code by the cellular phone 10. When the result of the determination received by the determination result receiver 33 is that the cellular phone 10 is allowed to perform the billing process, the receiver 33 notifies the service providing device 34 of the result.

The service providing device 34 has a function of providing the service as an object of billing. For example, in the case where the service is viewing of a movie, the device 34 opens a gate provided at the entry of the theater to let the user of the cellular phone 10 enter the theater.

The billing server 60 will be described below. The billing server 60 provided on the mobile communication network has a billing information database (hereinafter referred to as "billing information DB") 61 and manages the billing information transmitted from the cellular phone 10. FIG. 3 is a diagram showing an example of data stored in the billing information DB 61. As shown in FIG. 3, the billing information DB 61 stores each information of "user ID," "date of use," "service code," and "bill." The "user ID" is information for specifying each user to be billed. The user ID may be included in the billing information transmitted from each cellular phone 10, or the billing server 60 may determine the user ID on the basis of a calling telephone number of cellular phone 10. The "date of use" is information on a date of use of each service as a billing object. The "service code" is a code for specifying each service as a billing object. The information of service code is included in the billing information transmitted from each cellular phone 10. The "bill" is information on a charge to be billed, and the bill may be included in the billing information transmitted from each cellular phone 10 or may be determined by the billing server 60 on the basis of the service code in the billing information transmitted from each cellular phone 10.

Figure 4:
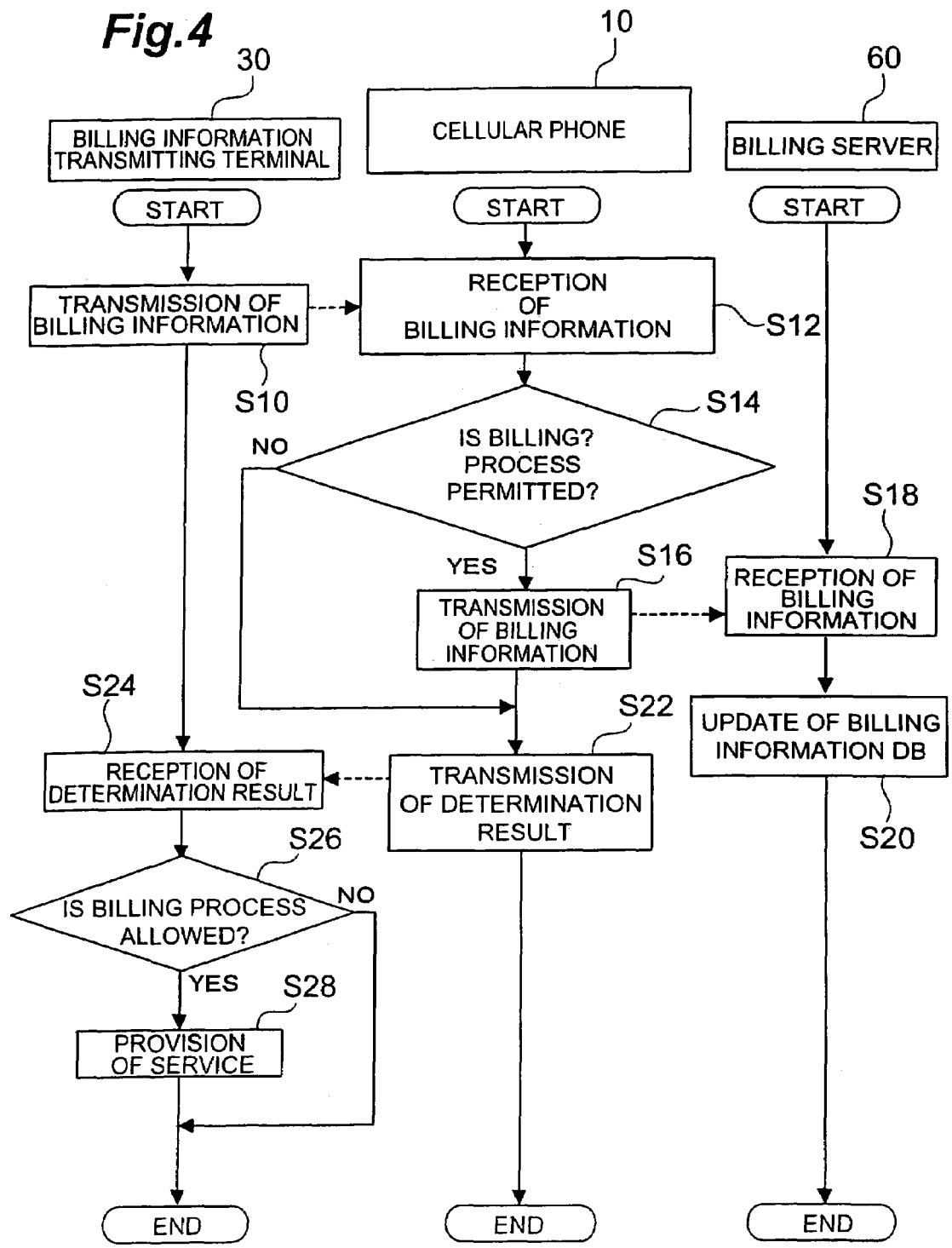
FIG. 4 is a flowchart showing the operation of the billing system according to the first embodiment.

The operation of the billing system 1 according to the first embodiment will be described below in conjunction with the billing method according to the first embodiment. FIG. 4 is a flowchart showing the operation of the billing system 1.

First, the billing information transmitting terminal 30 transmits the billing information to the cellular phone 10 (S10). The billing information transmitting terminal 30 periodically (e.g. every second) transmits the billing information by short-range wireless. When the cellular phone 10 goes into an area of wireless communication of the billing information transmitting terminal 30, the billing information receiver 16 thereof receives the billing information transmitted from the billing information transmitting terminal 30 (S12).

Then the cellular phone 10 determines whether the service specified by the service code in the received billing information is a service for which the cellular phone 10 is allowed to perform the billing process (S14). Specifically, the service code determining device 12 determines whether the received service code agrees with any service code stored in the service code file 11, and it determines with agreement of the service code that the cellular phone 10 is allowed to perform the billing process, but determines with disagreement of the service code that the billing process is not allowed. When the service code determining device 12 determines that the cellular phone is allowed to perform the billing process, the cellular phone 10 lets the billing information transmitter 17 transmit the billing information to the billing server 60 (S16). Then the billing server 60 receives the billing information transmitted from the cellular phone 10 (S18), and updates the billing information DB 61 on the basis of the received billing information (S20). When the service code determining device 12 determines that the cellular phone is not allowed to perform the billing process, the billing information is not transmitted and the cellular phone transfers to the next determination result transmitting step S22.

The cellular phone 10 next lets the determination result transmitter 13 transmit the result of the determination by the service code determining device 12 to the billing information transmitting terminal 30 (S22). The billing information transmitting terminal 30 receives the information on the result of the determination transmitted from the cellular phone 10, by the determination result receiver 33 (S24), and then it determines whether the cellular phone 10 is allowed to perform the billing process or not, on the basis of the received determination result (S26). When the cellular phone 10 is allowed to perform the billing process, the billing information transmitting terminal 30 lets the service providing device 34 provide the service as a billing object (S28). For example, in the case of the service being viewing of a movie, the service providing device 34 opens an entry gate of a theater to let the user enter the theater.

In the billing system 1 of the first embodiment, the cellular phone 10 has the service code determining device 12, which determines whether the service specified by the service code in the billing information transmitted from the billing information transmitting terminal 30 is a service for which the cellular phone 10 is allowed to perform the billing process. This eliminates the need for the user's determining whether the service is one for which the billing process is valid, at every transmission of billing information and manipulating the cellular phone 10, and thus facilitates the operation in the billing process. The determination on the service code by the service code determining device 12 permits the cellular phone to select the billing information to be processed, even in the case where there exist a plurality of billing information transmitting terminals 30 within the wireless-communicable area of the cellular phone 10 and where the billing information is transmitted from each of the terminals.

In the billing method of the first embodiment, whether the service specified by the service code transmitted in the billing information transmitting step is a service for which the cellular phone 10 is allowed to perform the process, is determined in the service code determining step, so that the billing method can facilitate the user's operation and adapt to the case where a plurality of billing information transmitting terminals 30 exist around the cellular phone 10, just as in the case of the billing system 1.

Figure 5:
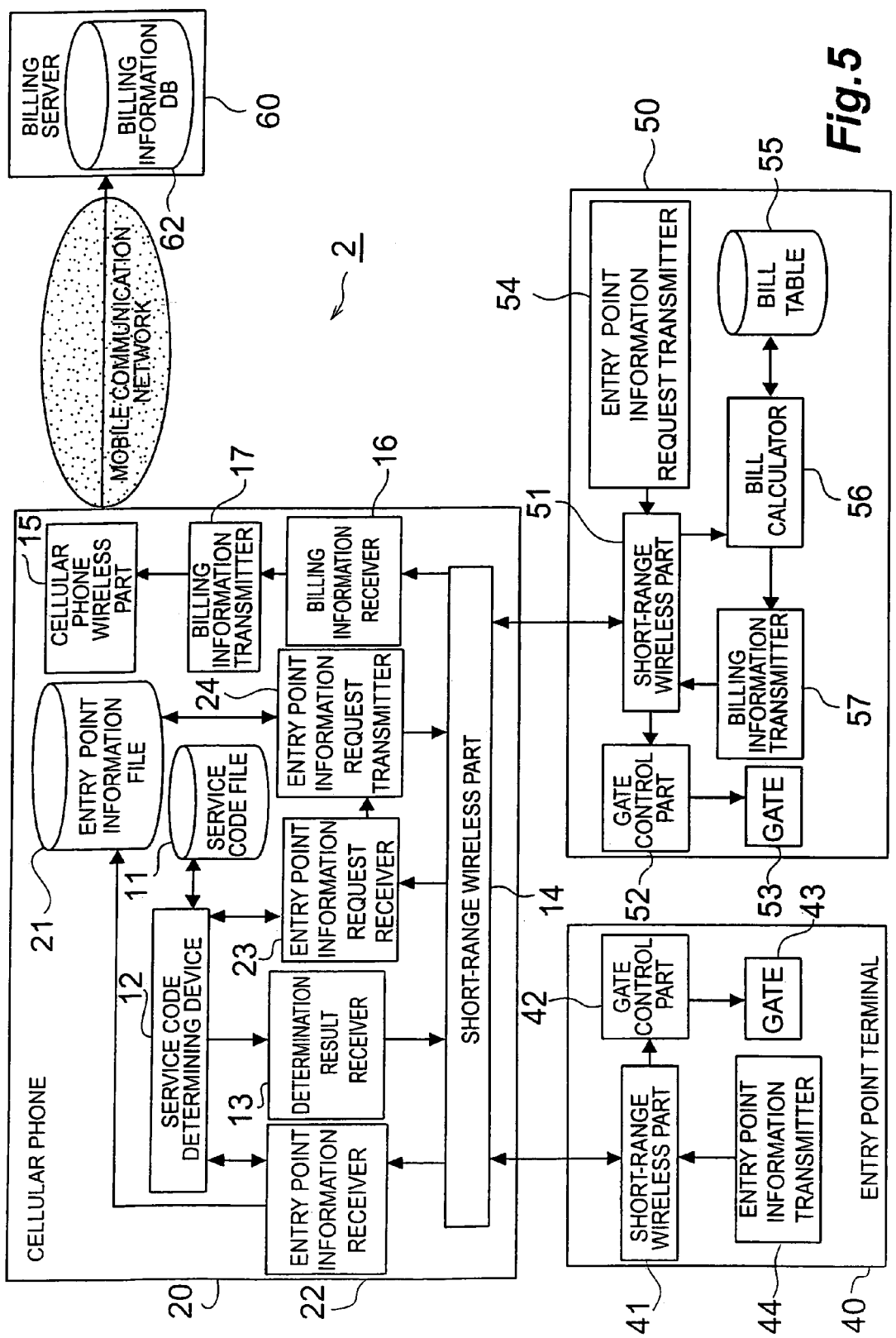
FIG. 5 is a diagram showing the configuration of the billing system according to the second embodiment.

The billing system 2 according to the second embodiment of the present invention will be described next. The billing system 2 of the second embodiment is a billing system adapted to the scheme of determining a bill on the basis of an entry and exit into and from a billing zone, like the ticket gates in train stations and the tollgates of highways. FIG. 5 is a block diagram showing the configuration of the billing system 2 according to the second embodiment.

The billing system 2 of the second embodiment has a billing server 60 provided on a mobile communication network; a cellular phone (mobile terminal) 20 communicable with the billing server 60 through the mobile communication network; and an entry point terminal 40 and an exit point terminal 50 communicable with the cellular phone 20 by short-range wireless. The entry point terminal 40 is located at an entry point into a billing zone, and the exit point terminal 50 at an exit point out of the billing zone. In contrast, it is also possible to employ a configuration wherein a terminal having the both functions of the entry point terminal 40 and exit point terminal 50 is located at a point of a single place to allow an entry and exit into and out of a billing zone like a ticket gate in a train station.

The cellular phone 20 has a short-range wireless part 14 for communication with the entry point terminal 40 and with the exit point terminal 50; a cellular phone wireless part 15 for communication through the mobile communication network; a service code file 11 storing a service code of a service for which the cellular phone 20 is allowed to perform the billing process; a service code determining device 12 for determining whether a service code transmitted from the entry point terminal 40 or from the exit point terminal 50 is a service code for which the cellular phone 20 is allowed to perform the billing process; a determination result transmitter 13 for transmitting the result of the determination by the service code determining device 12 to the entry point terminal 40 or to the exit point terminal 50; an entry point information file 21 storing entry point information about a point where the user of the cellular phone 20 entered a billing zone; an entry point information receiver 22 for receiving entry point information transmitted from the entry point terminal 40; an entry point information request receiver 23 for receiving an entry point information request transmitted from the exit point information terminal; an entry point information transmitter 24 for transmitting the entry point information to the exit point terminal 50; a billing information receiver 16 for receiving billing information transmitted from the exit point terminal 50; and a billing information transmitter 17 for transmitting the billing information transmitted from the exit point terminal 50, to the billing server 60.

Each of the elements constituting the cellular phone 20 will be described below. The short-range wireless part 14 and cellular phone wireless part 15 are the same as the short-range wireless part 14 and cellular phone wireless part 15 of the cellular phone 10 in the first embodiment.

The service code file 11 stores the same data as the service code file 11 of the cellular phone 10 in the first embodiment, and the service code determining device 12 has a function of determining whether the service specified by the service code transmitted from the entry point terminal 40 or from the exit point terminal 50 is a service for which the cellular phone 20 is allowed to perform the billing process, in much the same manner as the service code determining device 12 of the cellular phone 10 did in the first embodiment.

The determination result transmitter 13 has a function of transmitting the result of the determination by the service code determining device 12 to the entry point terminal 40 or the exit point terminal 50 having transmitted the service code. The result of the determination transmitted herein is information on whether the cellular phone 20 is allowed to perform the billing process for the service specified by the service code.

Figure 6:
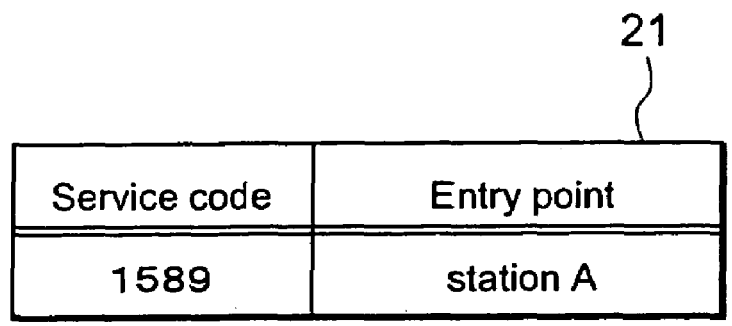
FIG. 6 is a diagram showing an example of data stored in the entry point information file.

The entry point information file 21 is a file to store information about a point where the user of the cellular phone 20 entered a billing zone. FIG. 6 is a diagram showing an example of data stored in the entry point information file 21. As shown in FIG. 6, the entry point information file 21 stores information of "service code" and "entry point." The "service code" is a code for specifying a service as a billing object, and indicates a type of the service upon the entry into the billing zone. The service code allows the phone, for example, to identify a route, an operating company, and so on. The "entry point" is information about a point where the user entered a billing zone and, in the example shown in FIG. 6, information of a station is stored like station A. Although only one entry point information is stored in the example shown in FIG. 6, it is also possible to store a plurality of information items in the entry point information file 21. In the case where a plurality of entry point information items are stored, the entry point information items can be discriminated from each other by service codes associated with the respective entry point information items.

The entry point information receiver 22 has a function of receiving entry point information and a service code transmitted from the entry point terminal 40. The entry point information receiver 22 has a function of feeding the received service code to the service code determining device 12 to let the device 12 determine whether the cellular phone 20 is allowed to perform the billing process, and storing the received entry point information in the entry point information file 21 when it is determined that the cellular phone is allowed to perform the billing process.

The entry point information request receiver 23 has a function of receiving an entry point information request and a service code transmitted from the exit point terminal 50. The "entry point information request" is a request for information about a point where the user of the cellular phone 20 entered the billing zone. The entry point information request receiver 23 has a function of feeding the received service code to the service code determining device 12 to let the device 12 determine whether the cellular phone 20 is allowed to perform the billing process, and notifying the entry point information transmitter 24 of the reception of the entry point information request when it is determined that the cellular phone is allowed to perform the billing process.

The entry point information transmitter 24 has a function of retrieving the entry point information from the entry point information file 21 and transmitting the information to the exit point terminal 50. In the case where a plurality of entry point information items are stored in the entry point information file 21, the entry point information retrieved from the entry point information file 21 is an entry point information item stored in association with the service code received by the entry point information request receiver 23.

The billing information receiver 16 has a function of receiving the billing information transmitted from the exit point terminal 50.

The billing information transmitter 17 has a function of transmitting the billing information received by the billing information receiver 16, through the mobile communication network to the billing server 60.

The entry point terminal 40 will be described below. The entry point terminal 40 has a short-range wireless part 41 for communication with the cellular phone 20; an entry point information transmitter 44 for transmitting entry point information; a gate 43 for regulating the entry into the billing zone; and a gate control part 42 for controlling opening and closing of the gate 43 on the basis of the result of the determination on the service code.

The short-range wireless part 41 is a wireless part having the same protocol as the short-range wireless part 14 of the cellular phone 20, which enables communication with the cellular phone 20.

The entry point information transmitter 44 has a function of transmitting the entry point information about the place of the billing point where the entry point terminal 40 is located. The entry point information enables the system to capture the point where the user of the cellular phone 20 entered the billing zone.

The gate 43 has a function of regulating the entry into the billing zone, and the gate control part 42 has a function of performing control to open the gate 43 on the occasion of receiving the result of the determination on the service code that the cellular phone 20 is allowed to perform the billing process.

The exit point terminal 50 will be described below. The exit point terminal 50 has a short-range wireless part 51 for communication with the cellular phone 20; an entry point information request transmitter 54 for transmitting an entry point information request; a bill table 55 storing bill information according to entry point information; a bill calculator 56 for calculating a bill on the basis of entry point information; a billing information transmitter 57 for transmitting billing information including the bill calculated by the bill calculator 56, to the cellular phone 20; a gate 53 for regulating the exit out of the billing zone; and a gate control part 52 for controlling opening and closing of the gate 53 on the basis of the result of the determination on the service code.

The short-range wireless part 51 is a wireless part having the same protocol as the short-range wireless part 14 of the cellular phone 20 has, which enables communication with the cellular phone 20.

The entry point information request transmitter 54 has a function of transmitting a request signal to request information on the point where the user entered the billing zone, to the cellular phone 20.

Figure 7:
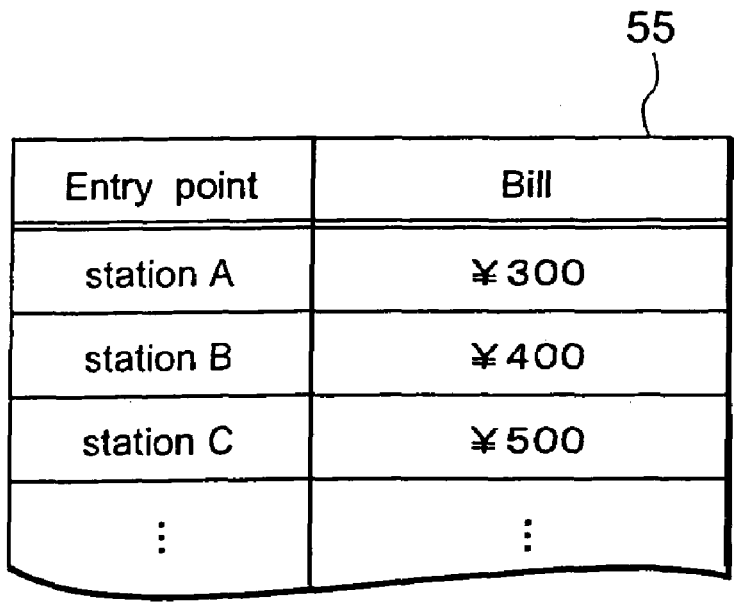
FIG. 7 is a diagram showing an example of data stored in the bill table.

The bill table 55 is a table used for determining a bill on the basis of an entry point into a billing zone. FIG. 7 is a diagram showing an example of data stored in the bill table 55. As shown in FIG. 7, bills are defined according to entry points in the bill table 55. For example, in the example shown in FIG. 7, the bill is 300 yen for the entry at station A. Since the exit point terminal 50 located at each exit point has such bill table 55, a bill can be calculated on the basis of an entry and exit into and out of a billing zone.

The bill calculator 56 has a function of calculating a bill on the basis of the entry point information from the cellular phone 20 with reference to the bill table 55.

The billing information transmitter 57 has a function of transmitting the billing information including the information on the bill calculated by the bill calculator 56, to the cellular phone 20. The billing information transmitted herein preferably includes the entry point information and the exit point information, in addition to the information on the bill.

The gate 53 has a function of regulating the exit from the billing zone, and the gate control part 52 has a function of performing control to open the gate 53 on the occasion of receiving the result of the determination on the service code that the cellular phone 20 is allowed to perform the billing process.

The billing server 60 will be described below. The billing server 60 provided on the mobile communication network has a billing information database (hereinafter referred to as "billing information DB") 62 and manages the billing information transmitted from the cellular phone 20. FIG. 8 is a diagram showing an example of data stored in the billing information DB 62. As shown in FIG. 8, the billing information DB 62 stores each information of "user ID," "date of use," "service code," "entry point," "exit point," and "bill." Each information of "user ID," "date of use," "service code," and "bill" is the same as each information of "user ID," "date of use," "service code," and "bill" stored in the billing information DB 61 in the first embodiment. The "entry point" is information indicating an entry point into a billing zone, and the "exit point" information indicating an exit point out of a billing zone; these information pieces clarify what is the sources for the calculation of each bill.

Figure 9:
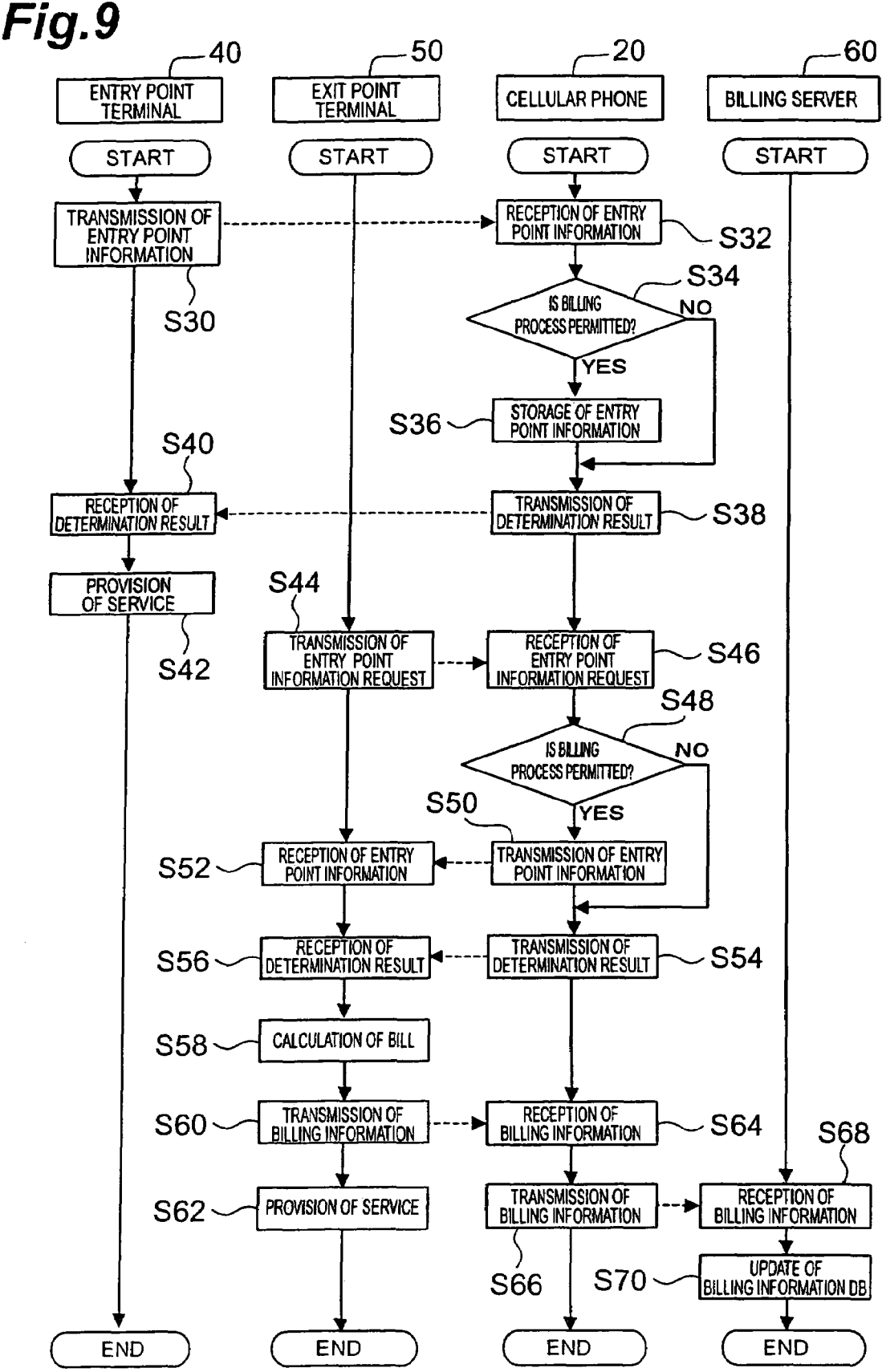
FIG. 9 is a flowchart showing the operation of the billing system according to the second embodiment.

The operation of the billing system 2 according to the second embodiment will be described below in conjunction with the billing method according to the second embodiment. FIG. 9 is a flowchart showing the operation of the billing system 2 according to the second embodiment.

First, the entry point terminal 40 transmits entry point information along with a service code to the cellular phone 20 (S30). Supposing herein that the entry point terminal 40 is located at station A, the entry point terminal 40 will transmit information of "station A" as the entry point information. When the user of the cellular phone 20 approaches the entry point of the billing zone (a ticket gate in station A), the cellular phone 20 receives the service code and entry point information transmitted from the entry point terminal 40 (S32) and determines whether the service specified by the received service code is a service for which the cellular phone 20 is allowed to perform the billing process (S34). Specifically, the service code determining device 12 determines whether the received service code agrees with any service code stored in the service code file 11, and it determines with agreement of the service code that the cellular phone 20 is allowed to perform the billing process but determines with disagreement of the service code that the cellular phone is not allowed to perform the billing process. When the service code determining device 12 determines that the billing process is allowed, the entry point information receiver 22 stores the received entry point information in the entry point information file 21 (S36). When the service code determining device 12 determines that the billing process is not allowed, a transition is made to the next determination result transmitting step S38, without storing the entry point information in the entry point information file 21.

Next, the cellular phone 20 lets the determination result transmitter 13 transmit the result of the determination by the service code determining device 12 to the entry point terminal 40 (S38). When the entry point terminal 40 receives the information on the result of the determination transmitted from the cellular phone 20 (S40), it determines whether the cellular phone 20 is allowed to perform the billing process or not, on the basis of the result of the determination received. When the billing process is allowed, the entry point terminal 40 provides the service as a billing object (S42). Namely, the gate control part 42 performs the control to open the gate 43 to let the user pass the ticket gate. FIG. 9 is illustrated without the determining step of determining whether the billing process is allowed or not, but the flow of the determination is much the same as that in step S26 in FIG. 4. The processing heretofore is the flow at the entry point of the billing zone.

Subsequently, a flow at the exit point of the billing zone will be described. The exit point terminal 50 transmits an entry point information request along a service code to the cellular phone 20 (S44). When the user of the cellular phone 20 approaches the exit point of the billing zone, the cellular phone 20 receives the service code and the entry point information request transmitted from the exit point terminal 50 (S46). It is then determined whether the service specified by the service code received is a service for which the cellular phone 20 is allowed to perform the billing process (S48). Specifically, the service code determining device 12 determines whether the received service code agrees with any service code stored in the service code file 11, and it determines with agreement of the service code that the cellular phone 20 is allowed to perform the billing process but determines with disagreement of the service code that the cellular phone is not allowed to perform the billing process. When the service code determining device 12 determines that the cellular phone is allowed to perform the billing process, the entry point information request receiver 23 notifies the entry point information transmitter 24 of reception of the entry point information request. The entry point information transmitter 24, thus notified of the reception of the entry point information request, retrieves the entry point information from the entry point information file 21 and transmits the entry point information to the exit point terminal 50 (S50). When on this occasion the entry point information file 21 stores a plurality of entry point information items, the transmitter 24 retrieves an entry point information item corresponding to the service code transmitted with the entry point information request, and sends the information item. The exit point terminal 50 receives the entry point information transmitted from the cellular phone 20 (S52). When the service code determining device 12 determines that the cellular phone 20 is not allowed to perform the billing process, a transition is made to the next determination result transmitting step S54, without transmitting the entry point information.

Subsequently, the cellular phone 20 lets the determination result transmitter 13 transmit the result of the determination by the service code determining device 12 to the exit point terminal 50 (S54). When the exit point terminal 50 receives the information on the result of the determination transmitted from the cellular phone 20 (S56), it determines whether the cellular phone 20 is allowed to perform the billing process or not, on the basis of the result of the determination received. When the cellular phone is allowed to perform the billing process, a bill is calculated on the basis of the received entry point information with reference to the bill table 55 (S58). Since the entry point information is "station A" herein (cf. FIG. 6), the bill is calculated as 300 yen on the basis of the bill table 55 shown in FIG. 7. FIG. 9 is illustrated without the determining step of determining whether the billing process is allowed or not, but the flow of the determination is much the same as that in step S26 in FIG. 4. Then the billing information transmitter 57 transmits the billing information including the bill calculated by the bill calculator 56, to the cellular phone 20 (S60). Subsequently, the exit point terminal 50 provides the service (S62). Namely, the exit point terminal 50 lets the gate control part 52 perform the control to open the gate 53, so as to let the user pass the ticket gate to the outside. When it is determined that the cellular phone 20 is not allowed to perform the billing process, on the basis of the result of the determination received in the determination result receiving step (S56), no transfer is made to the steps from the calculation of the bill (S58) to the provision of the service (S62), and the operation of the billing system is thus completed without executing the steps from the reception of the billing information (S64) to the update of billing DB (S70).

Then the cellular phone 20 receives the billing information transmitted from the exit point terminal 50, by the billing information receiver 16 (S64), and lets the billing information transmitter 17 transmit the received billing information to the billing server 60 (S66). Then the billing server 60 receives the billing information transmitted from the cellular phone 20 (S68) and updates the billing information DB 62 on the basis of the received billing information (S70).

In the billing system 2 of the second embodiment, the cellular phone 20 has the service code determining device 12, which determines whether the service specified by the service code transmitted from the entry point terminal 40 or from the exit point terminal 50 is a service for which the cellular phone 20 is allowed to perform the billing process. This obviates the need for the user's determining whether the service is one for which the billing process is allowed, at every transmission of the service code and manipulating the cellular phone 20, and can thus facilitate the operation upon the entry and exit into and out of the billing zone. The determination on the service code by the service code determining device 12 enables the cellular phone to select the entry point information or the entry point information request to be processed, even in the case where there exit a plurality of entry point terminals 40 or exit point terminals 50 within the range of wireless communication of the cellular phone 20 and where service codes are transmitted from the respective terminals.

In the billing system 2 of the second embodiment, the entry point terminal 40 transmits the entry point information and the exit point terminal 50 calculates the bill on the basis of the entry point information transmitted from the cellular phone 20, whereby billing can be done on the basis of the entry and exit into and out of the billing zone.

Since in the billing method of the second embodiment the service code determining step is arranged to determine whether the service specified by the service code transmitted from the entry point terminal or from the exit point terminal is a service for which the cellular phone 20 is allowed to perform the process, the billing method can facilitate the user's operation and can adapt to the case where a plurality of entry point terminals 40 or exit point terminals 50 exist around the cellular phone 20, just as in the case of the above billing system 2.

Figure 10:
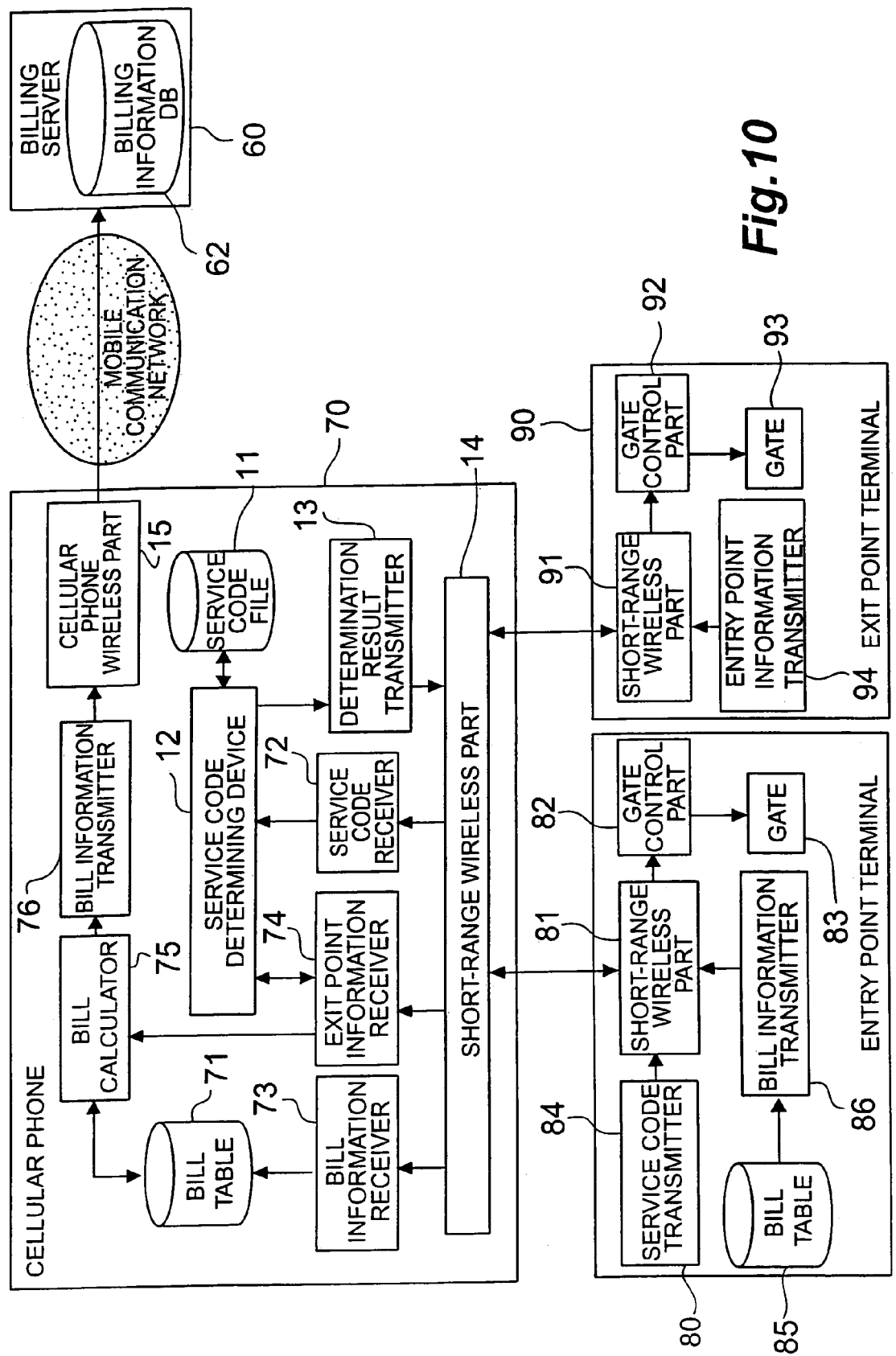
FIG. 10 is a diagram showing the configuration of the billing system according to the third embodiment.

The billing system according to the third embodiment of the present invention will be described below. The billing system 3 of the third embodiment is a billing system adapted to the scheme of determining a bill on the basis of an entry and exit into and out of a billing zone, as the billing system 2 of the second embodiment was. FIG. 10 is a block diagram showing the configuration of the billing system 3 according to the third embodiment.

The billing system 3 of the third embodiment has a billing server 60 provided on a mobile communication network; a cellular phone (mobile terminal) 70 communicable with the billing server 60 through the mobile communication network; and an entry point terminal 80 and an exit point terminal 90 communicable with the cellular phone 70 by short-range wireless. The entry point terminal 80 is located at an entry point into a billing zone and the exit point terminal 90 at an exit point out of the billing zone. However, it is also possible to employ a configuration wherein a terminal having the both functions of the entry point terminal 80 and the exit point terminal 90 is located at a point of a single place to permit the entry and exit into and out of the billing zone like a ticket gate in a train station.

The cellular phone 70 has a short-range wireless part 14 for communication with the entry point terminal 80 and with the exit point terminal 90; a cellular phone wireless part 15 for communication through the mobile communication network; a service code file 11 storing a service code of a service for which the cellular phone 70 is allowed to perform the billing process; a service code determining device 12 for determining whether a service code transmitted from the entry point terminal 80 or from the exit point terminal 90 is a service code for which the cellular phone 70 is allowed to perform the billing process; a determination result transmitter 13 for transmitting the result of the determination by the service code determining device 12 to the entry point terminal 80 or to the exit point terminal 90; a service code receiver 72 for receiving the service code transmitted from the entry point terminal 80; a bill information receiver 73 for receiving bill information transmitted from the entry point terminal 80; a bill table 71 for storing the bill information received by the bill information receiver 73; an exit point information receiver 74 for receiving exit point information transmitted from the exit point terminal 90; a bill calculator 75 for calculating a bill on the basis of the exit point information received by the exit point information receiver 74 and the bill information stored in the bill table 71; and a billing information transmitter 76 for transmitting bill information including the bill calculated by the bill calculator 75, to the billing server 60.

Each of the elements constituting the cellular phone 70 will be described below. The short-range wireless part 14 and cellular phone wireless part 15 are the same as the short-range wireless part 14 and cellular phone wireless part 15 of the cellular phone 10 in the first embodiment.

The service code file 11, service code determining device 12, and determination result transmitter 13 are the same as the service code file 11, service code determining device 12, and determination result transmitter 13 of the cellular phone 20 in the second embodiment.

The service code receiver 72 has a function of receiving the service code transmitted from the entry point terminal 80 and feeding the received service code to the service code determining device 12.

Figure 11:
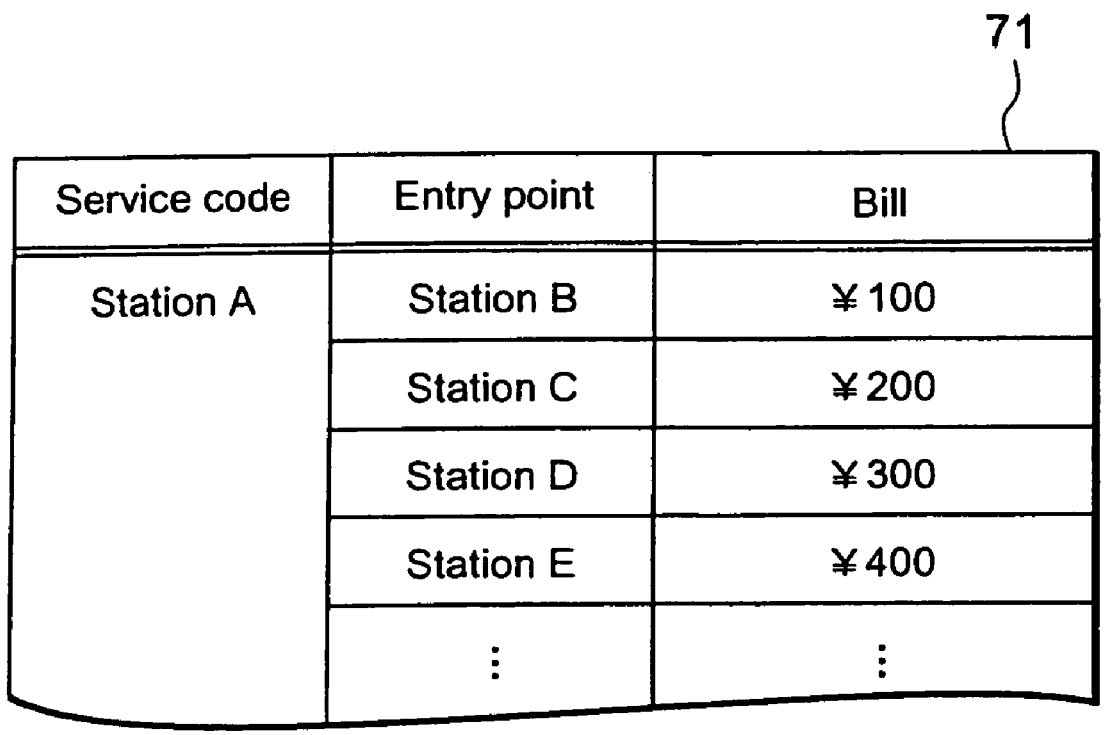
FIG. 11 is a diagram showing an example of data stored in the bill table.

The bill table 71 has a function of storing the bill information transmitted from the entry point terminal 80. FIG. 11 is a diagram showing an example of data stored in the bill table 71. The bill table 71 stores each information of "entry point," "exit point," and "bill." The "entry point" is information about a point where the user of the cellular phone 70 entered a billing zone. The information of "exit point" and "bill" is data indicating a relation of correspondence between exit points and bills. For example, it is seen that the bill is 100 yen when the user exits the billing zone at station B.

The bill information receiver 73 has a function of receiving the bill information transmitted from the entry point terminal 80 and storing the received bill information in the bill table 71.

The exit point information receiver 74 has a function of receiving the exit point information and service code transmitted from the exit point terminal 90. The exit point information receiver 74 has a function of feeding the received service code to the service code determining device 12 to let it determine whether the cellular phone 70 is allowed to perform the billing process, and notifying the bill calculator 75 of the received exit point information when it is determined that the cellular phone is allowed to perform the billing process.

The bill calculator 75 has a function of calculating a bill on the basis of the exit point information notified of by the exit point information receiver 74 and the bill information stored in the bill table 71.

The billing information transmitter 76 has a function of transmitting the billing information including information on the bill calculated by the bill calculator 75, through the mobile communication network to the billing server 60.

The entry point terminal 80 will be described below. The entry point terminal 80 has a short-range wireless part 81 for communication with the cellular phone 70; a service code transmitter 84 for transmitting a service code; a bill table 85 storing bill information for determining a bill on the basis of an exit point; a bill information transmitter 86 for transmitting bill information; a gate 83 for regulating the entry into the billing zone; and a gate control part 82 for performing control to open and close the gate 83 on the basis of the result of the determination on the service code.

The short-range wireless part 81 is a wireless part having the same protocol as the short-range wireless part 14 of the cellular phone 70 has, which enables communication with the cellular phone 70.

The service code transmitter 84 has a function of transmitting a service code specifying a service provided by the entry point terminal 80.

The bill table 85 is a table storing the bill information for determining a bill on the basis of an exit point, in which each bill is stored in correspondence with exit point information. The bill table 85 stores the same information as the bill information shown in FIG. 11.

The bill information transmitter 86 has a function of transmitting the bill information to the cellular phone 70 by short-range wireless.

The gate 83 has a function of regulating the entry into the billing zone, and the gate control part 82 has a function of performing control to open the gate 83 on the occasion of receiving the result of the determination on the service code that the cellular phone 70 is allowed to perform the billing process.

The exit point terminal 90 will be described below. The exit point terminal 90 has a short-range wireless part 91 for communication with the cellular phone 70; an exit point information transmitter 94 for transmitting exit point information; a gate 93 for regulating the exit out of the billing zone; and a gate control part 92 for performing control to open and close the gate 93 on the basis of the result of the determination on the service code.

The short-range wireless part 91 is a wireless part having the same protocol as the short-range wireless part 14 of the cellular phone 70 has, which enables communication with the cellular phone 70.

The exit point information transmitter 94 has a function of transmitting exit point information about a place of a billing point where the exit point terminal 90 is located. The exit point information-permits the system to capture a point where the user of the cellular phone 70 exits out of the billing zone.

The gate 93 has a function of regulating the exit from the billing zone, and the gate control part 92 has a function of performing control to open the gate 93 on the occasion of receiving the result of the determination on the service code that the cellular phone 70 is allowed to perform the billing process.

The billing server 60 will be described below. The billing server 60 provided on the mobile communication network has a billing information database (hereinafter referred to as "billing information DB") 62 and manages the billing information transmitted from the cellular phone 70. The data stored in the billing information DB is the same as the data stored in the billing server 60 in the second embodiment.

Figure 12:
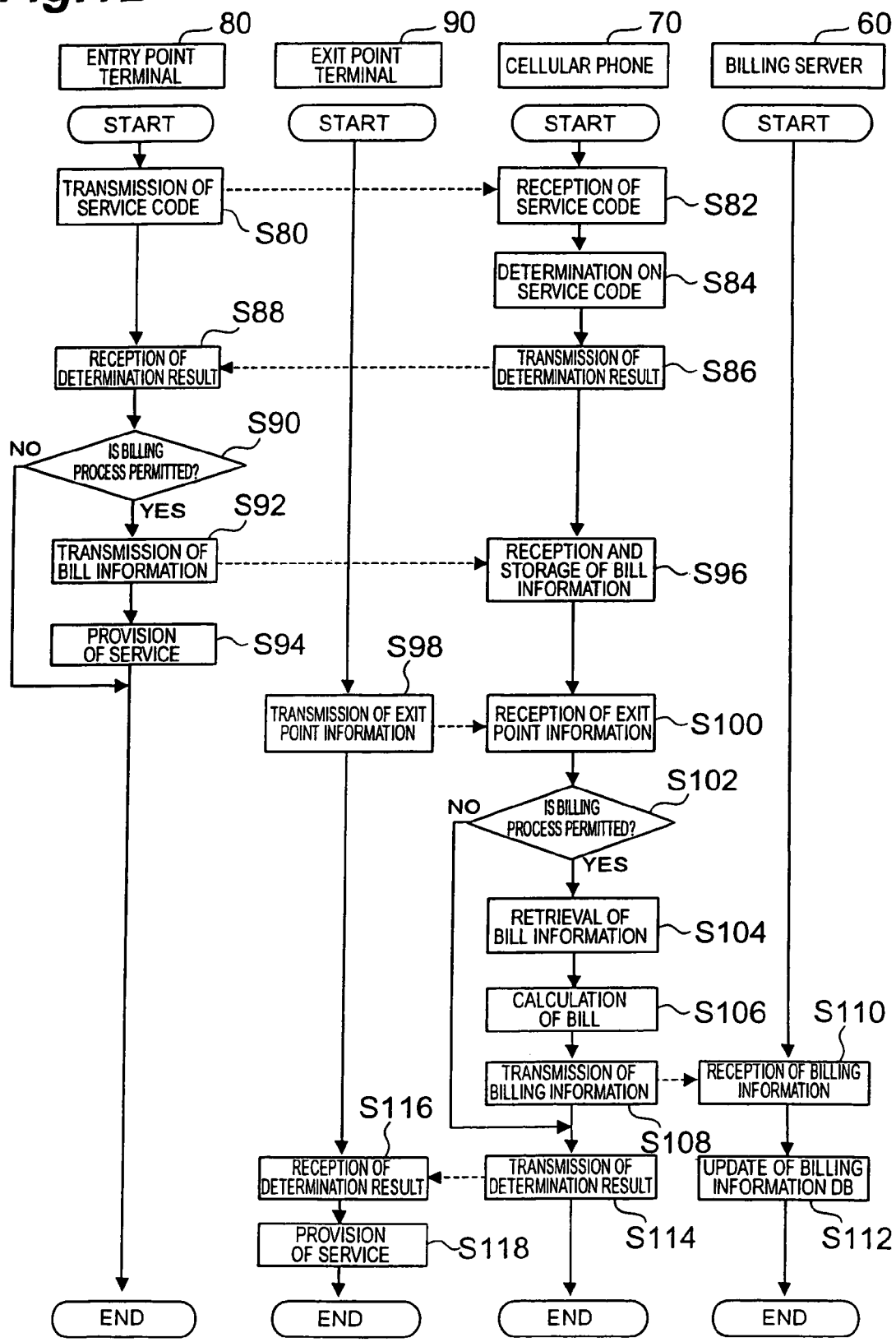
FIG. 12 is a flowchart showing the operation of the billing system according to the third embodiment.

The operation of the billing system 3 according to the third embodiment will be described in conjunction with the billing method according to the third embodiment. FIG. 12 is a flowchart showing the operation of the billing system 3 according to the third embodiment.

First, the entry point terminal 80 sends a service code to the cellular phone 70 (S80). Let us suppose herein that the entry point terminal 80 is located at station A. When the user of the cellular phone 70 approaches the entry point of the billing zone (the ticket gate in station A), the cellular phone 70 receives the service code transmitted from the entry point terminal 80 (S82) and determines whether the service specified by the service code received is a service for which the cellular phone 70 is allowed to perform the billing process (S84). Specifically, the service code determining device 12 determines whether the received service code agrees with any service code stored in the service code file 11, and it determines with agreement of the service code that the cellular phone 70 is allowed to perform the billing process, but determines with disagreement of the service code that the cellular phone is not allowed to perform the billing process. Subsequently, the cellular phone 70 lets the determination result transmitter 13 transmit the result of the determination on the service code to the entry point terminal 80 (S86) and the entry point terminal 80 receives the result of the determination transmitted from the cellular phone 70 (S88).

Then the entry point terminal 80 determines whether the cellular phone 70 is allowed to perform the billing process or not, on the basis of the received determination result (S90). When the cellular phone is allowed to perform the billing process, the entry point terminal 80 retrieves the bill information from the bill table 85 and transmits the bill information to the cellular phone 70 (S92), and it provides the service as a billing object (S94). In this case, the gate control part 82 performs the control to open the gate 83 to allow the user to pass the ticket gate. When the cellular phone is not allowed to perform the billing process, the entry point terminal 80 terminates the operation of the entry point terminal 80, without transferring to the steps of transmission of bill information (S92) and provision of service (S94).

Then the cellular phone 70 receives the bill information transmitted from the entry point terminal 80 and stores the received bill information in the bill table 71 (S96). The processing heretofore is the flow at the entry point of the billing zone.

Subsequently, the flow at the exit point of the billing zone will be described. The exit point terminal 90 transmits the exit point information along with the service code to the cellular phone 70 (S98). When the user of the cellular phone 70 approaches the exit point of the billing zone, the cellular phone 70 receives the service code and exit point information transmitted from the exit point terminal 80 (S100). In the present embodiment, the exit point terminal 90 transmits the exit point information on a periodic basis (e.g. every second)

and the cellular phone 70 receives the exit point information when it is located near the exit point. However, it is also possible to employ a configuration wherein the cellular phone 70 is provided with an exit point information request transmitter for transmitting a request for exit point information to the exit point terminal 90 and the exit point terminal 90 transmits the exit point information in accordance with the request transmitted from the exit point information request transmitter.

Then the cellular phone 70 determines whether the service specified by the received service code is a service for which the cellular phone 70 is allowed to perform the billing process (S102). Specifically, the service code determining device 12 determines whether the received service code agrees with any service code stored in the service code file 11, and it determines with agreement of the service code that the cellular phone 70 is allowed to perform the billing process, but determines with disagreement of the service code that the cellular phone is not allowed to perform the billing process. When the service code determining device 12 determines that the cellular phone is allowed to perform the billing process, the exit point information receiver 74 notifies the bill calculator 75 of the received exit point information. The bill calculator 75, thus notified of the exit point information, retrieves the bill information stored in the bill table 71 (S104) and calculates the bill on the basis of the bill information and the exit point information (S106). Subsequently, the cellular phone 70 lets the billing information transmitter 76 transmit the billing information including the calculated bill to the billing server 60 (S108). When the billing server 60 receives the billing information transmitted from the cellular phone 70 (S110), it updates the billing information DB 62 on the basis of the billing information (S112). When the service code determining device 12 determines that the cellular phone 70 is not allowed to perform the billing process, a transition is made to the next determination result transmitting step S114, without transferring to the steps of retrieval of bill information (S104), calculation of bill (S106), and transmission of billing information (S108).

The cellular phone 70 lets the determination result transmitter 13 transmit the result of the determination by the service code determining device 12 to the exit point terminal 90 (S114). When the exit point terminal 90 receives the information on the result of the determination transmitted from the cellular phone 70 (S116), it determines whether the cellular phone 70 is allowed to perform the billing process or not, on the basis of the received determination result. When the cellular phone is allowed to perform the billing process, the exit point terminal 90 provides the service (S118). Namely, the exit point terminal 90 lets the gate control part 92 perform the control to open the gate 93, so as to allow the user to pass the ticket gate to the outside. When it is determined that the cellular phone 70 is not allowed to perform the billing process, on the basis of the result of the determination received in the determination result receiving step (S116), the operation of the exit point terminal 90 is completed without transferring up to the step of the provision of service (S118). FIG. 12 is illustrated without the step of determining whether the cellular phone is allowed to perform the billing process or not, on the basis of the determination result received in the determination result receiving step S116, but the flow of the determination is much the same as that in step S90.

In the billing system 3 of the third embodiment, the cellular phone 70 has the service code determining device 12, which determines whether the service specified by the service code transmitted from the entry point terminal 80 or from the exit point terminal 90 is a service for which the cellular phone 70 is allowed to perform the billing process. This obviates the need for the user's determining whether the service is one for which the cellular phone is allowed to perform the billing process, at every transmission of the service code and manipulating the cellular phone 70, and thus facilitates the operation upon the entry and exit into and out of the billing zone. The determination on the service code by the service code determining device 12 enables the cellular phone to select the entry point information or the entry point information request to be processed, even in the case where a plurality of entry point terminals 80 or exit point terminals 90 exist in the range of wireless communication of the cellular phone 70 and where service codes are transmitted from the respective terminals.

In the billing system 3 of the third embodiment, the entry point terminal 80 transmits the bill information and the exit point terminal 90 transmits the exit point information. Then the cellular phone 70 calculates the bill on the basis of the bill information and the exit point information. This enables the billing based on the entry and exit into and out of the billing zone.

Since the cellular phone 70 has the bill calculator 75, the bill can be quickly calculated on the basis of the exit point information transmitted from the exit point terminal 90.

In the billing method of the third embodiment, whether the service specified by the service code transmitted from the entry point terminal 80 or from the exit point terminal 90 is a service for which the cellular phone 70 is allowed to perform the process is determined in the service code determining step, and thus the billing method of the present embodiment can facilitate the user's operation and adapt to the configuration where a plurality of entry point terminals 80 or exit point terminals 90 exist around the cellular phone 70, just as in the case of the billing system 3.

The above described the billing systems of the present invention in detail using the embodiments, but it is noted that the billing systems according to the present invention are by no means intended to be limited to the above embodiments.

Figure 13A:
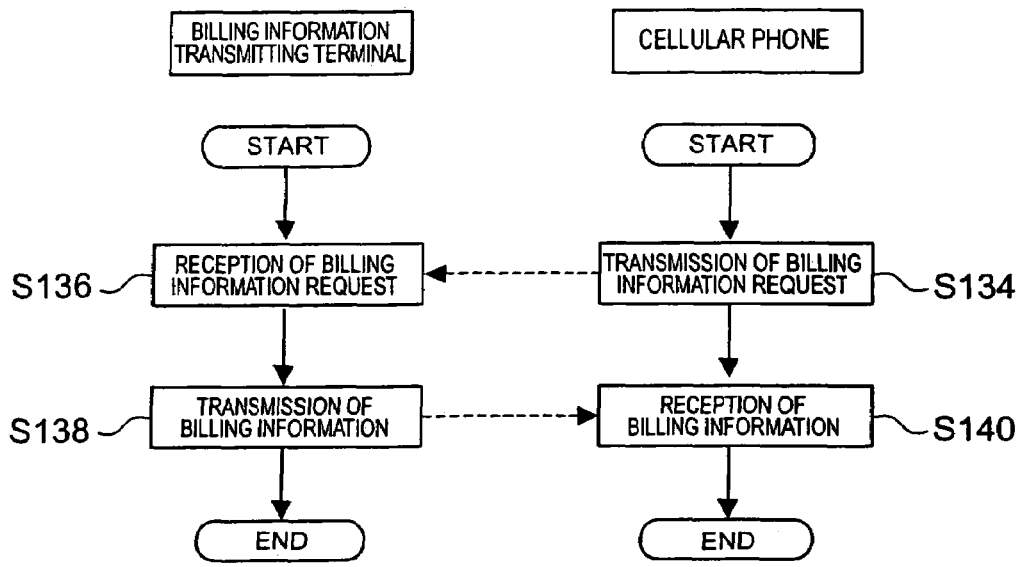
FIG. 13 is flowcharts showing other flows of transmission of billing information.
Figure 13B:
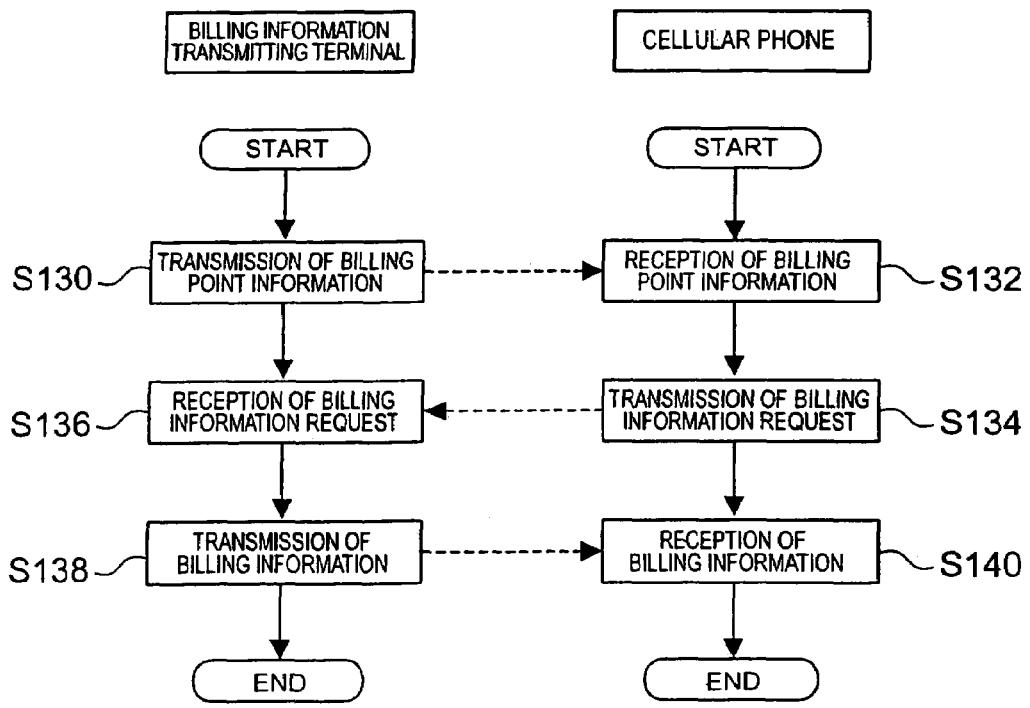

The above first embodiment was configured so that the billing information transmitting terminal 30 transmitted the billing information to the interior of the range of wireless communication on a periodic basis and the cellular phone 10 entering the interior of the range of wireless communication received the billing information, but the flow of transmission of billing information does not have to be limited to this example. For example, it is also possible to employ a configuration wherein, as shown in FIG. 13(*a*), the cellular phone 10 transmits a billing information request on a periodic basis (e.g. every second) (S134) and, when the billing information transmitting terminal 30 receives a billing information request (S136), it transmits the billing information to the cellular phone 10 (S138). It is also possible to employ a configuration wherein, as shown in FIG. 13(*b*), the billing information transmitting terminal 30 transmits billing point information to notify that there is a billing point in the wireless communication zone thereof (S130) and, when the cellular phone 10 enters the wireless communication range to receive the billing point information (S132), it transmits a billing information request to the billing information transmitting terminal 30 (S134). The flows of transmission of billing information described herein are also applicable to the transmission of the entry point information from the entry point terminal 40, 80 and the transmission of the entry point information request from the exit point terminal 50, 90 in the second embodiment and the third embodiment.

It was described in the above embodiments that the wireless communication was implemented by Bluetooth (Registered Trademark) between the mobile terminal and the billing information transmitting terminal or between the mobile terminal and the entry point terminal or the exit point terminal, but the wireless communication can also be implemented by any means other than Bluetooth (Registered Trademark); for example, it is also possible to apply infrared communication or non-contact IC.

According to the present invention, the mobile terminal stores the service code of the service for which it is allowed to perform the billing process, in the service code storing means and, when the billing information including the service code is transmitted from the billing information transmitting terminal, it is determined whether the service specified by the transmitted service code is a service for which the mobile terminal is allowed to perform the billing process, on the basis of the service code stored in the service code storing means. When the result of the determination is that the service is one for which the mobile terminal is allowed to perform the billing process, the billing information transmitting means transmits the billing information to the billing server; therefore, the user does not have to determine whether the billing process is allowed and manipulate the mobile terminal, whereby the operation becomes simple in the billing process. Since whether the service is one for which the cellular phone is allowed to perform the billing process is determined on the basis of the service code preliminarily stored, even in the case where there exist a plurality of billing information transmitting terminals within the communication range of the mobile terminal and where the billing information is received from each of the billing information transmitting terminals, the user does not have to select the billing information by operation and the mobile terminal is able to perform the billing process for only the predetermined service.

The present invention is also applicable to the billing scheme of determining the bill on the basis of the entry and exit into and out of the billing zone in the configuration wherein the service code for which the mobile terminal is allowed to perform the billing process is stored in the service code storing means, whether the service code transmitted from the entry point terminal or from the exit point terminal located at the entry or exit point of the billing zone is a service for which the mobile terminal is allowed to perform the billing process, on the basis of the service code stored in the service code storing means, and, when the result of the determination is that the service is one for which the mobile terminal is allowed to perform the billing process, the processing upon the entry and exit is performed; this configuration facilitates the user's operation upon the entry and exit into and from the billing zone. Since the mobile terminal determines whether the service is one for which the mobile terminal is allowed to perform the billing process, on the basis of the service code preliminarily stored, even in the case where there exist a plurality of entry point terminals or exit point terminals within the communication range of the mobile terminal and where the entry point information or the entry point information request is received from each of the entry point terminals or the exit point terminals, the user does not have to select the entry point information or the entry point information request by operation and the mobile terminal is able to perform the billing process for the entry and exit into and from the predetermined billing zone.

What is claimed is:

1. A billing system applied to a billing scheme of determining a bill on the basis of entry into and exit from a billing zone, and comprising a billing server provided on a mobile communication network, a mobile terminal for transmitting billing information through the mobile communication network to the billing server, an entry point terminal located at an entry point into the billing zone and configured to communicate with the mobile terminal by short-range wireless, and an exit point terminal located at an exit point out of the billing zone and configured to communicate with the mobile terminal by short-range wireless, wherein said entry point terminal comprises:

entry point information transmitting means for transmitting entry point information about the entry point along with a service code specifying a service of a billing object, to the mobile terminal, wherein said exit point terminal comprises:

entry point information request transmitting means for transmitting an entry point information request to request entry point information, along with a service code specifying a service of a billing object to the mobile terminal;

bill determining means for determining a bill on the basis of the entry point information transmitted according to the entry point information request from the mobile terminal; and billing information transmitting means for transmitting billing information including the bill determined by the bill determining means, to the mobile terminal, and wherein said mobile terminal comprises:

service code storing means storing a service code of a service for which the mobile terminal is allowed to perform a billing process;

service code determining means for determining whether the service specified by the service code transmitted from the entry point terminal or from the exit point terminal is a service for which the mobile terminal is allowed to perform the billing process, on the basis of the service code stored in the service code storing means;

entry point information storing means for storing the entry point information about the entry point into the billing zone;

entry point information receiving means for receiving the entry point information transmitted from the entry point terminal and for, when the service code determining means determines that the service code transmitted along with the entry point information is a service code for which the mobile terminal is allowed to perform the billing process, storing the entry point information received, in the entry point information storing means;

entry point information request receiving means for receiving the entry point information request and the service code transmitted from the exit point terminal;

entry point information transmitting means for, when the service code determining means determines that the service code received by the entry point information request receiving means is a service code for which the mobile terminal is allowed to perform the billing process, retrieving the entry point information stored in the entry point information storing means and transmitting the entry point information to the exit point terminal;

billing information receiving means for receiving the billing information transmitted from the exit point terminal; and billing information transmitting means for transmitting the billing information received by the billing information receiving means, through the mobile communication network to the billing server.

2. The billing system according to claim 1, wherein the entry point information receiving means stores the entry point information in association with the service code received with the entry point information, in the entry point information storing means, and wherein the entry point information transmitting means of the mobile terminal retrieves the entry point information stored in association with the service code received by the entry point information request receiving means, from the entry point information storing means and transmits the entry point information to the exit point terminal.

3. The billing system according to claim 1, wherein the mobile terminal further comprises:

determination result transmitting means for transmitting a result of the determination by the service code determining means on whether the service code is a service code for which the mobile terminal is allowed to perform the billing process, to the entry point terminal or to the exit point terminal, and wherein said entry point terminal and said exit point terminal further comprise a gate controlled to open and close on the basis of the result of the determination on the service code transmitted by the determination result transmitting means from the mobile terminal.

4. A billing method applied to a billing scheme of determining a bill on the basis of entry into and exit from a billing zone, and adapted to perform billing by a billing server provided on a mobile communication network, a mobile terminal for transmitting billing information through the mobile communication network to the billing server, an entry point terminal located at an entry point into the billing zone and configured to communicate with the mobile terminal by short-range wireless, and an exit point terminal located at an exit point out of the billing zone and configured to communicate with the mobile terminal by short-range wireless, said billing method comprising:

a first entry point information transmitting step of transmitting entry point information about the entry point along with a service code specifying a service of a billing object, from the entry point terminal to the mobile terminal;

a first service code determining step of determining whether the service specified by the service code transmitted in the first entry point information transmitting step is a service for which the mobile terminal is allowed to perform a billing process, with reference to service code storing means preliminarily storing a service code for which the mobile terminal is allowed to perform the billing process;

an entry point information storing step of, when it is determined in the first service code determining step that the service code transmitted in the first entry point information transmitting step is a service code for which the mobile terminal is allowed to perform the process, storing the entry point information transmitted to the mobile terminal in the first entry point information transmitting step, in entry point information storing means;

an entry point information request transmitting step of transmitting an entry point information request to request entry point information, along with a service code specifying a service of a billing object from the exit point terminal to the mobile terminal;

a second service code determining step of determining whether the service specified by the service code transmitted in the entry point information request transmitting step is a service code for which the mobile terminal is allowed to perform the billing process, with reference to the service code storing means preliminarily storing the service code for which the mobile terminal is allowed to perform the billing process;

a second entry point information transmitting step of, when it is determined in the second service code determining step that the service code transmitted in the entry point information request transmitting step is a service code for which the mobile terminal is allowed to perform the process, retrieving the entry point information stored in the entry point information storing mean's and transmitting the entry point information from the mobile terminal to the exit point terminal;

a bill determining step of letting the exit point terminal determine a bill on the basis of the entry point information transmitted in the entry point information transmitting step;

a first billing information transmitting step of transmitting billing information including the bill determined in the bill determining step, from the exit point terminal to the mobile terminal; and a second billing information transmitting step of transmitting the billing information transmitted in the first billing information transmitting step, from the mobile terminal through the mobile communication network to the billing server.

5. The billing method according to claim 4, wherein said entry point information storing step is to store the entry point information in association with the service code received in the first entry point information transmitting step, in the entry point information storing means, and wherein said second entry point information transmitting step is to retrieve the entry point information stored in association with the service code received in the entry point information request transmitting step, from the entry point information storing means and transmit the entry point information to the exit point terminal.

6. The billing method according to claim 4, further comprising:

a first determination result transmitting step of transmitting a result of the determination in the first service code determining step from the mobile terminal to the entry point terminal;

an entry gate opening and closing step of opening and closing a gate provided at the entry point terminal, on the basis of the result of the determination transmitted in the first determination result transmitting step;

a second determination result transmitting step of transmitting a result of the determination in the second service code determining step from the mobile terminal to the exit point terminal; and an exit gate opening and closing step of opening and closing a gate provided at the exit point terminal, on the basis of the result of the determination transmitted in the second determination result transmitting step.

* * * * *